United States Patent
Babazaki

(10) Patent No.: US 12,417,546 B2
(45) Date of Patent: Sep. 16, 2025

(54) LEARNING DEVICE, LEARNING METHOD, TRACKING DEVICE, AND STORAGE MEDIUM

(71) Applicant: NEC Corporation, Tokyo (JP)

(72) Inventor: Yasunori Babazaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 398 days.

(21) Appl. No.: 18/021,296

(22) PCT Filed: Aug. 27, 2020

(86) PCT No.: PCT/JP2020/032459
§ 371 (c)(1),
(2) Date: Feb. 14, 2023

(87) PCT Pub. No.: WO2022/044222
PCT Pub. Date: Mar. 3, 2022

(65) Prior Publication Data
US 2023/0326041 A1 Oct. 12, 2023

(51) Int. Cl.
*G06T 7/246* (2017.01)
*G06T 7/73* (2017.01)

(52) U.S. Cl.
CPC ............... *G06T 7/248* (2017.01); *G06T 7/73* (2017.01); *G06T 2207/20076* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

2013/0050502 A1 2/2013 Saito et al.
2019/0066313 A1 2/2019 Kim et al.
(Continued)

FOREIGN PATENT DOCUMENTS

CN 107563313 A 1/2018
JP 2018-026108 A 2/2018
(Continued)

OTHER PUBLICATIONS

International Search Report for PCT Application No. PCT/JP2020/032459, mailed on Nov. 24, 2020.
(Continued)

*Primary Examiner* — Leon Viet Q Nguyen
(74) *Attorney, Agent, or Firm* — Sughrue Mion, PLLC

(57) ABSTRACT

A learning device 1X includes an acquisition means 15X, an estimation result matching means 16X, and a learning means 18X. The acquisition means 15X acquires tracking training data in which first and second training images in time series, tracking target position information regarding position or posture of a tracking target shown in each first and second training images, and identification information of the tracking target are associated. The estimation result matching means 16X compares the tracking target position information with posture information indicating posture of the tracking target estimated from the first and second training images and associates the posture information with the identification information. The learning means 18X learns an inference engine, which infers correspondence information indicating correspondence relation of the tracking target between the training images when information based on the posture information is inputted, the correspondence information based on the posture information and the identification information.

13 Claims, 18 Drawing Sheets

(56) References Cited

U.S. PATENT DOCUMENTS

2019/0147292 A1  5/2019  Watanabe et al.
2020/0294373 A1* 9/2020  Srinivasan ............. H04N 7/181
2021/0158566 A1* 5/2021  Ogawa ................... G06N 3/045

FOREIGN PATENT DOCUMENTS

JP   2019-091138 A   6/2019
WO   2011/102416 A1  8/2011

OTHER PUBLICATIONS

Henschel, Roberto et al., "Multiple People Tracking using Body and Joint Detections", 2019 IEEE/CVF Conference on Computer Vision and Pattern Recognition Workshops (CVPRW) [online], IEEE, Apr. 9, 2020, pp. 770-779.

Leal-Taixe, Laura et al., "Learning by tracking: Siamese CNN for robust target association", arXiv.org [online], arXiv:1604.07866v3, Cornel University, 2016, <URL : https://arxiv.org/pdf/1604.07866v3>, pp. 1-9.

* cited by examiner

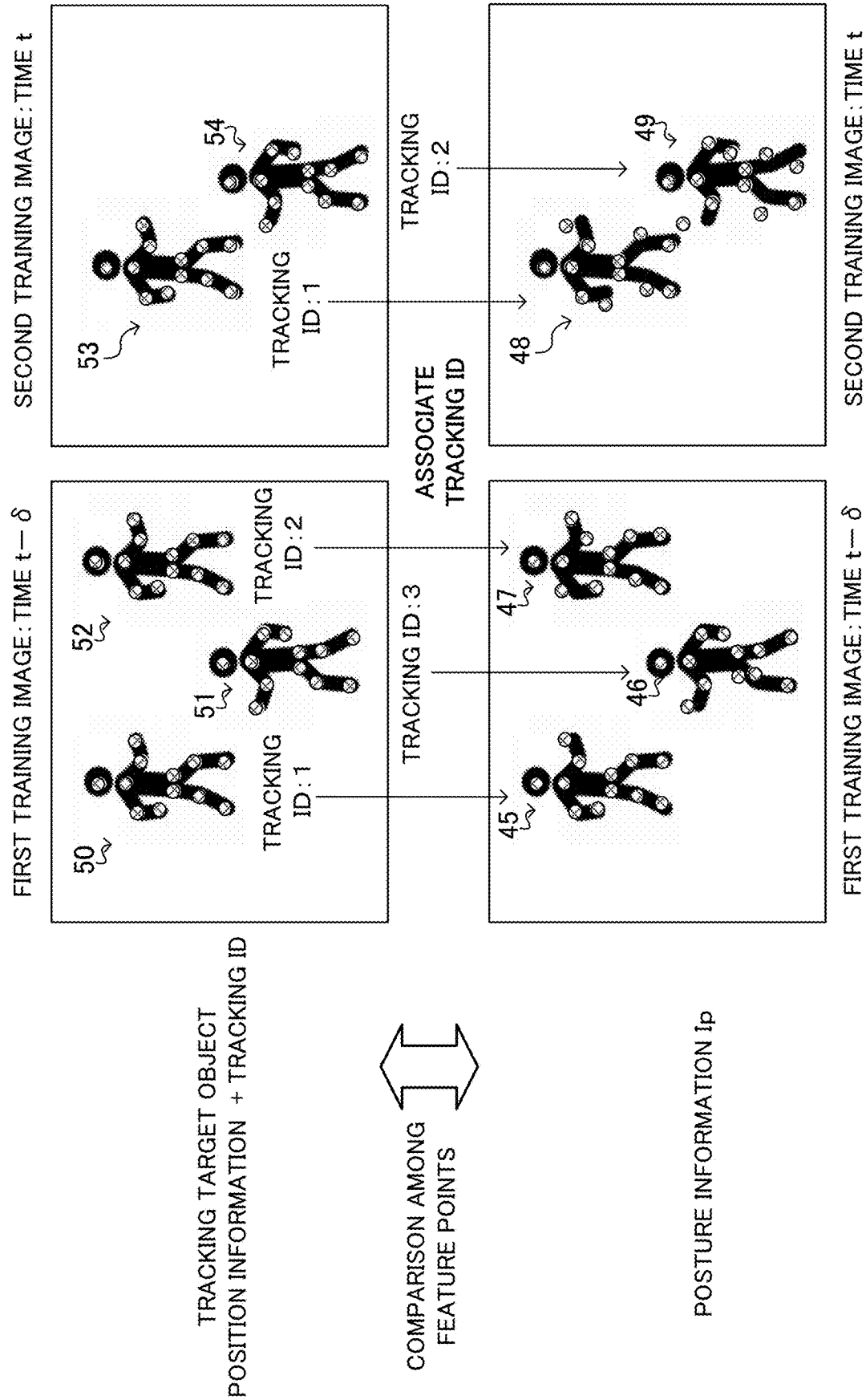

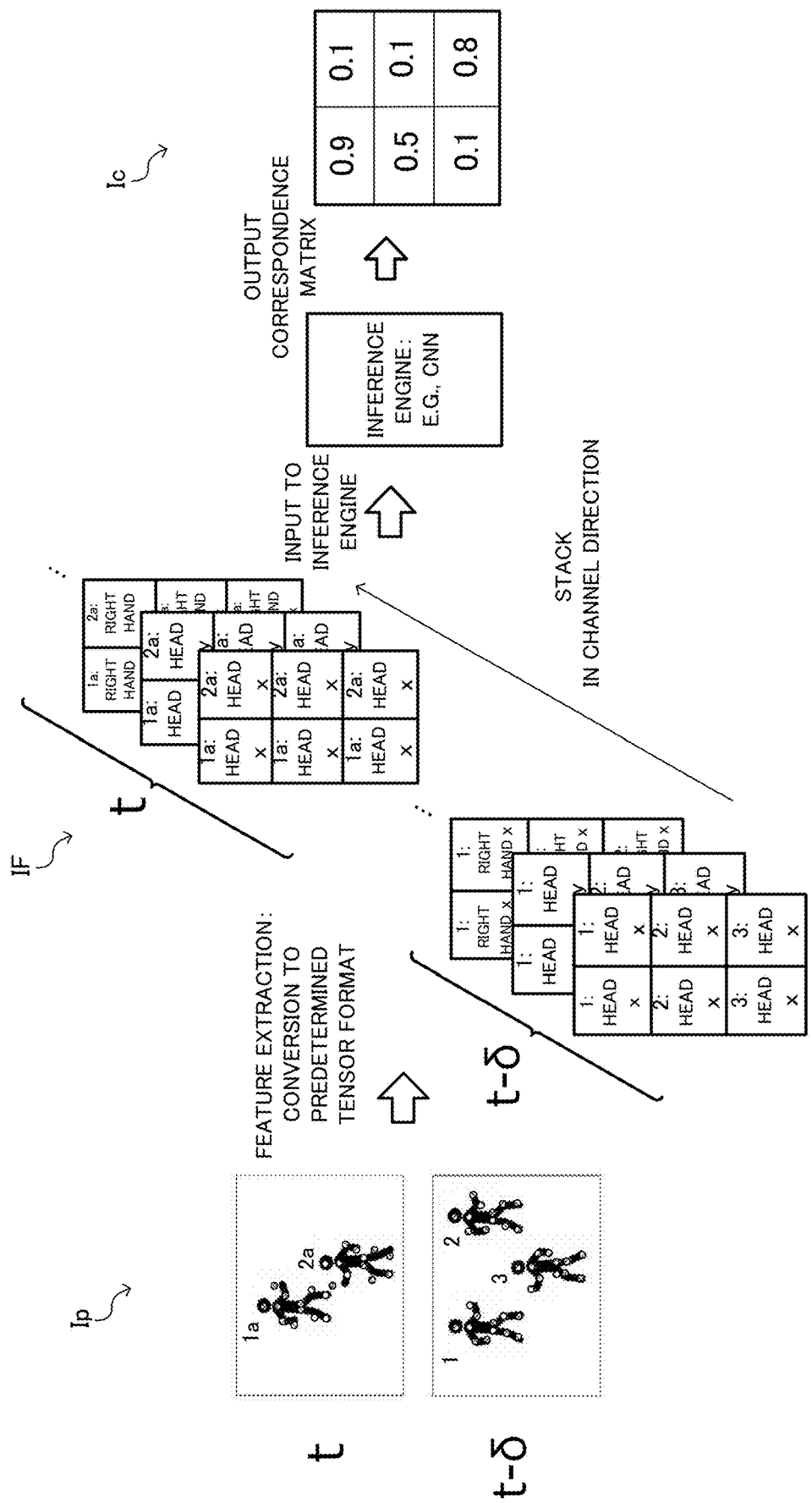

DETECTION NUMBER USED IN FIRST IMAGE

| 1: HEAD x | 1: HEAD x |
|---|---|
| 2: HEAD x | 2: HEAD x |
| 3: HEAD x | 3: HEAD x |

DETECTION NUMBER USED IN SECOND IMAGE →

| 1a: HEAD x | 2a: HEAD x |
|---|---|
| 1a: HEAD x | 2a: HEAD x |
| 1a: HEAD x | 2a: HEAD x |

DETECTION NUMBER USED IN SECOND IMAGE →

DETECTION NUMBER USED IN FIRST IMAGE ↓

| DISTANCE BETWEEN 1: & 1a: HEAD HEAD x x | DISTANCE BETWEEN 1: & 2a: HEAD HEAD x x |
|---|---|
| DISTANCE BETWEEN 2: & 1a: HEAD HEAD x x | DISTANCE BETWEEN 2: & 2a: HEAD HEAD x x |
| DISTANCE BETWEEN 3: & 1a: HEAD HEAD x x | DISTANCE BETWEEN 3: & 2a: HEAD HEAD x x |

FIG. 13A

CHANNEL REPRESENTING
CORRESPONDENCE PROBABILITY

| 1 | 0 |
|---|---|
| 0 | 0 |
| 0 | 1 |

CHANNEL REPRESENTING
NON- CORRESPONDENCE
PROBABILITY

| 0 | 1 |
|---|---|
| 1 | 1 |
| 1 | 0 |

FIG. 13B

CHANNEL REPRESENTING
CORRESPONDENCE PROBABILITY

| 1 | 0 | 0 |
|---|---|---|
| 0 | 0 | 1 |
| 0 | 1 | 0 |

CHANNEL REPRESENTING
NON- CORRESPONDENCE
PROBABILITY

| 0 | 1 | 1 |
|---|---|---|
| 1 | 1 | 0 |
| 1 | 0 | 1 |

FIG. 13C

CHANNEL REPRESENTING
CORRESPONDENCE PROBABILITY

| 1 | 0 |
|---|---|
| 0 | 0 |
| 0 | 1 |
| 0 | 0 |

CHANNEL REPRESENTING
NON- CORRESPONDENCE
PROBABILITY

| 0 | 1 |
|---|---|
| 1 | 1 |
| 1 | 0 |
| 1 | 1 |

FIG. 14A

SUM PER ROW IS 1 →

| 1 | 0 | 0 |
|---|---|---|
| 0 | 0 | 1 |
| 0 | 1 | 0 |

FIG. 14B

| 1 | 0 |
|---|---|
| 0 | 0 |
| 0 | 1 |
| 0 | 0 |

SUM PER COLUMN IS 1 ↓

LEARNING DEVICE, LEARNING METHOD, TRACKING DEVICE, AND STORAGE MEDIUM

This application is a National Stage Entry of PCT/JP2020/032459 filed on Aug. 27, 2020, the contents of all of which are incorporated herein by reference, in their entirety.

TECHNICAL FIELD

The present disclosure relates to a technical field of a learning device, a learning method, a tracking device, and a storage medium.

BACKGROUND ART

In the safety-related field, there is a technique to track people and objects among time series images. For example, Patent Literature 1 discloses an image retrieval device configured to recognize the posture information of a person from each image of an inputted moving image thereby to track the person based on the degree of similarity of the posture.

CITATION LIST

Patent Literature

Patent Literature 1: JP 2019-091138A

SUMMARY

Problem to be Solved

As in Patent Literature 1, when performing the tracking process based on the posture information, there is an issue that the accuracy of the tracking process is lowered when an error occurs in the posture estimation.

In view of the above-described issue, it is therefore an example object of the present disclosure to provide a learning device, a tracking device, a learning method, and a storage medium capable of suitably performing learning regarding tracking of a target object to be tracked among images.

Means for Solving the Problem

In one mode of the learning device, there is provided a learning device including:
an acquisition means configured to acquire tracking training data in which a first training image and a second training image which are training images captured in time series, tracking target object position information regarding a position or a posture of a tracking target object shown in each of the first training image and the second training image, and identification information of the tracking target object are associated;
an estimation result matching means configured to compare the tracking target object position information with posture information indicative of an estimated posture of the tracking target object estimated from each of the first training image and the second training image and associate the posture information with the identification information; and a learning means configured to learn an inference engine based on the posture information and the identification information,
the inference engine being configured to infer correspondence information when information based on the posture information is inputted to the inference engine,
the correspondence information indicating correspondence relation of the tracking target object between the first training image and the second training image.

In one mode of the learning method, there is provided a learning method executed by a computer, the learning method including:
acquiring tracking training data in which a first training image and a second training image which are training images captured in time series, tracking target object position information regarding a position or a posture of a tracking target object shown in each of the first training image and the second training image, and identification information of the tracking target object are associated;
comparing the tracking target object position information with posture information indicative of an estimated posture of the tracking target object estimated from each of the first training image and the second training image and associating the posture information with the identification information; and
learning an inference engine based on the posture information and the identification information,
the inference engine being configured to infer correspondence information when information based on the posture information is inputted to the inference engine,
the correspondence information indicating correspondence relation of the tracking target object between the first training image and the second training image.

In one mode of the storage medium, there is provided a storage medium storing a program executed by a computer, the program causing the computer to:
acquire tracking training data in which a first training image and a second training image which are training images captured in time series, tracking target object position information regarding a position or a posture of a tracking target object shown in each of the first training image and the second training image, and identification information of the tracking target object are associated;
compare the tracking target object position information with posture information indicative of an estimated posture of the tracking target object estimated from each of the first training image and the second training image and associate the posture information with the identification information; and
learn an inference engine based on the posture information and the identification information,
the inference engine being configured to infer correspondence information when information based on the posture information is inputted to the inference engine,
the correspondence information indicating correspondence relation of the tracking target object between the first training image and the second training image.

Effect

An example advantage according to the present invention is to suitably perform learning regarding tracking of a target object to be tracked among images.

BRIEF DESCRIPTION OF THE DRAWINGS

FIG. 7 is a diagram showing an outline of a matching process when the tracking target object position information indicates the positions of feature (characteristic) points of each tracking target object shown in a first training image and a second training image.

FIG. 8 illustrates a schematic diagram of a generation process of feature information and correspondence information.

FIG. 9A illustrates a matrix in the channel corresponding to the x-coordinate value of the head in a first image according to a first form of the feature information.

FIG. 9B illustrates a matrix in the channel corresponding to the x-coordinate value of the head in a second image according to the first form of the feature information.

FIG. 11 illustrates a matrix in the channel corresponding to the x-coordinate value of the head according to a second form of the feature information.

FIG. 13A illustrates an example of the correspondence matrix set as a correct answer in a first learning specification when the inference engine outputs the correspondence matrix in the format shown in FIG. 12A.

FIG. 13B illustrates an example of a first matrix of the correspondence matrix set as a correct answer in the first learning specification when the inference engine outputs the correspondence matrix in the format shown in FIG. 12B.

FIG. 13C illustrates an example of a second matrix of the correspondence matrix set as a correct answer in the first learning specification when the inference engine outputs the correspondence matrix in the format shown in FIG. 12B.

FIG. 14A illustrates an example of a first matrix of the correspondence matrix set as a correct answer in a second learning specification when the inference engine outputs the correspondence matrix in the format shown in FIG. 12B.

FIG. 14B illustrates an example of a second matrix of the correspondence matrix set as a correct answer in the second learning specification when the inference engine outputs the correspondence matrix in the format shown in FIG. 12B.

EXAMPLE EMBODIMENTS

Hereinafter, example embodiments of a learning device, a tracking device, a learning method, and a storage medium will be described with reference to the drawings.

First Example Embodiment (1) Overall Configuration

Figure 1:
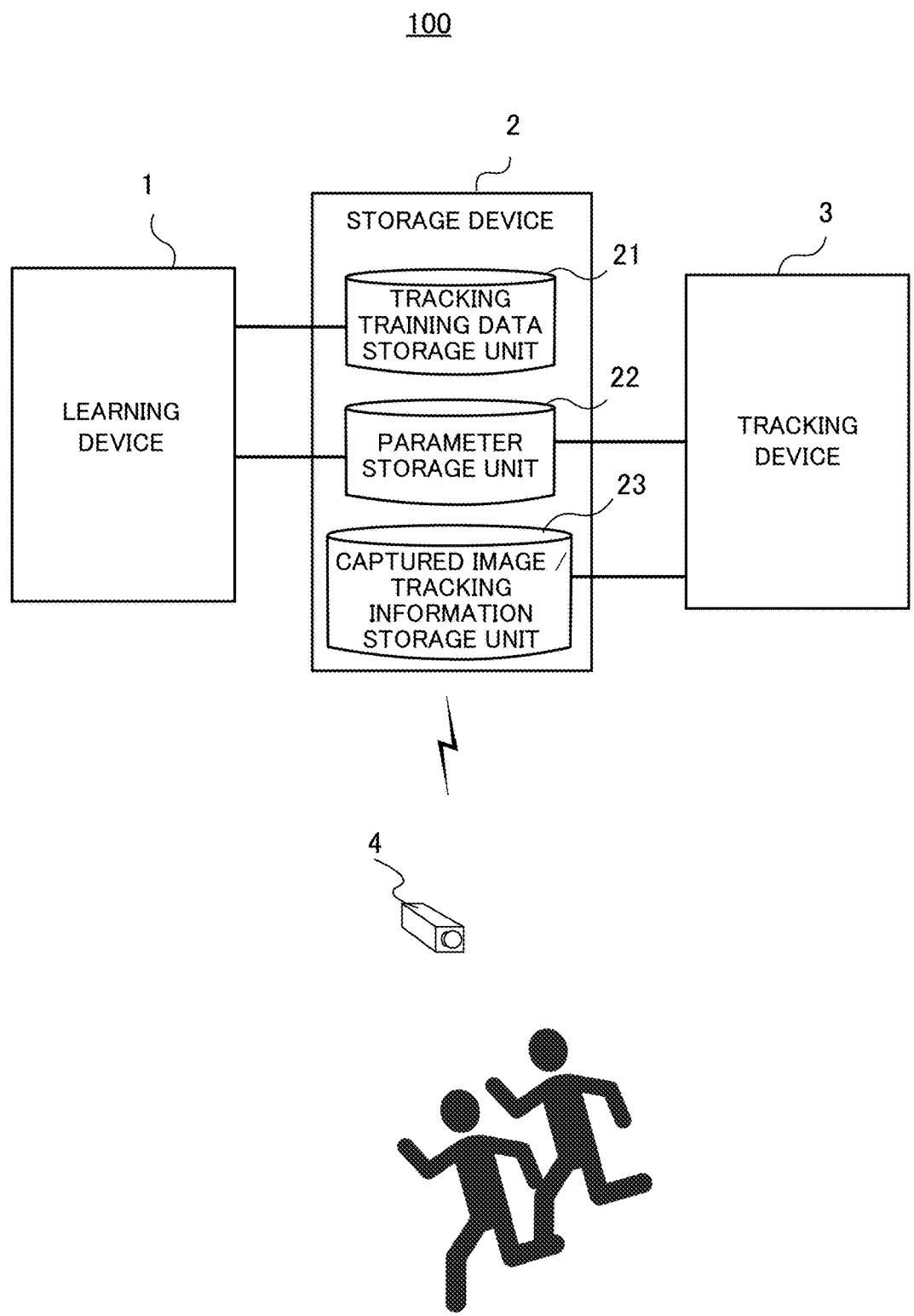
FIG. 1 is a schematic configuration of a tracking system in an example embodiment.

FIG. 1 is a schematic configuration of a tracking system 100 in the first example embodiment. The tracking system 100 is a system for tracking an object. The tracking system 100 mainly includes a learning device 1 configured to perform learning of an inference engine that is a model configured to make an inference regarding the tracking of an object, a storage device 2 configured to store information necessary for tracking, a tracking device 3 configured to perform execution and management of the tracking, and a camera 4 configured to capture a target space of tracking.

The learning device 1 learns an inference engine that is a model configured to make an inference regarding tracking on the basis of tracking training data stored in a tracking training data storage unit 21 of the storage device 2, and stores parameters of the inference engine obtained by learning in the parameter storage unit 22.

The storage device 2 includes the tracking training data storage unit 21, a parameter storage unit 22, and a captured image/tracking information storage unit 23. Each of these storage units will be described later. The storage device 2 may be one or more external storage devices such as a hard disk connected to the learning device 1 or the tracking device 3, or may be one or more storage media such as a flash memory, or may be one or more server devices or the like configured to perform data communication with the learning device 1 and the tracking device 3. Further, the storage device 2 is configured by a plurality of storage devices to hold each storage unit described above in a dispersed manner.

The tracking device 3 identifies the correspondence relation, among time-series images, of particular objects (also referred to as "tracking target objects") shown in the time-series images photographed by the camera 4 and assigns common identification information (also referred to as a "tracking ID") to such tracking target objects that are identical to one another among the time-series images to manage the tracking target objects. Here, a tracking target object may be a person in general, may be a person having a specific attribute (e.g., gender and age), or may be a specific type of a moving object (such as a vehicle) other than a person. By referring to parameters stored in the parameter storage unit 22, the tracking device 3 constructs an inference engine that is a model configured to infer a correspondence relation, among images, of tracking target objects, and infers information (also referred to as "correspondence information Ic") indicating the correspondence relation, among images, of the tracking target objects based on the inference engine.

The configuration of the tracking system 100 shown in FIG. 1 is an example, and various changes may be applied to the configuration. For example, at least two of the learning device 1, the storage device 2, and the tracking device 3 may be realized by the same device. In other examples, the learning device 1 and the tracking device 3 may each be configured by a plurality of devices. In this case, the plurality of devices constituting the learning device 1 and the plurality of devices constituting the tracking device 3 exchange information necessary for executing preassigned process among devices by wired or wireless direct communication or by communication through a network.

(2) Data Structure

Next, the data stored in the storage device 2 will be described.

Figure 2A:
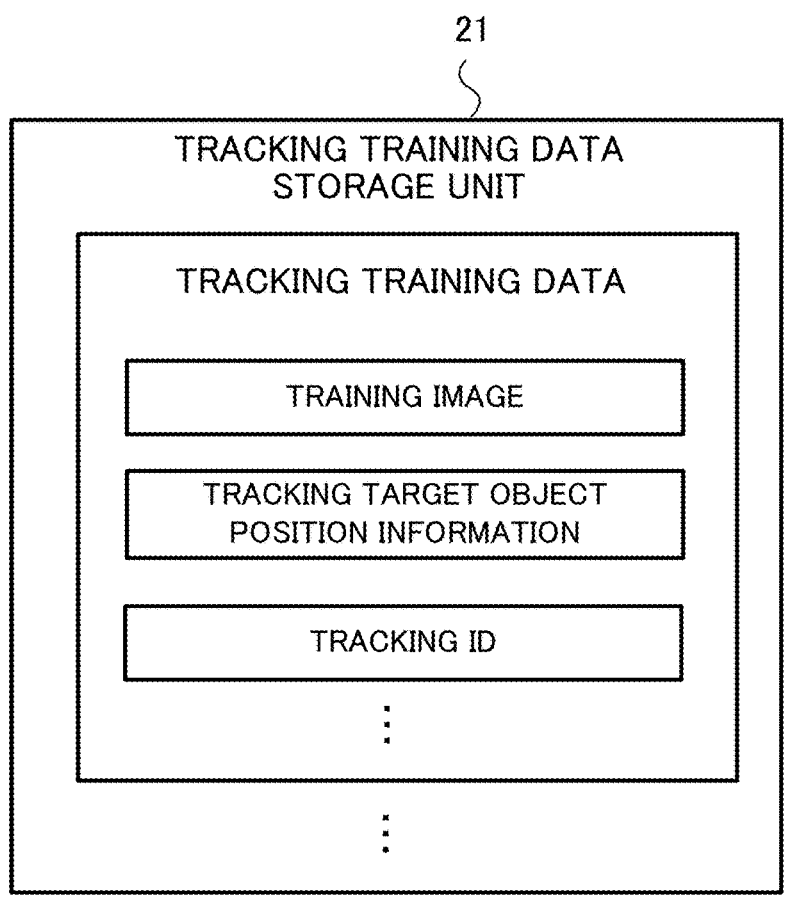
FIG. 2A illustrates an example of the data structure of tracking training data stored by a tracking training data storage unit.

The tracking training data storage unit 21 stores tracking training data which is data to be used for learning (training) by the learning device 1. FIG. 2A shows an example of a data structure of the tracking training data. As shown in FIG. 2A, the tracking training data at least includes time series training images, the tracking target object position information, and the tracking ID.

The training images are images taken on a time series basis. The time series training images may be a first group of images generated at time intervals based on the frame rate of the camera, or may be a second group of images extracted from the first group at predetermined number-of-images intervals. Then, the tracked position data and the tracked ID are associated with each tracking target object shown in each image of the time series training images.

The tracking target object position information is information on the position of a tracking target object shown in each image of the time series training images. For example, the tracking target object position information may be information indicating the existence area, in each image, of a tracking target object shown in each image of the time series training images, or may be information indicating the positions, in each image, of feature points of the tracking target object. Here, the term "feature point" herein indicates a position of a characteristic part in the tracking target object and is determined in advance according to the type of the target object to be tracked. For example, when the tracking target object is a person, the feature points indicate the positions of the joints generally provided in a person.

The parameter storage unit 22 stores the parameters necessary for configuring the inference engine used by the tracking device 3. The learning model used as the inference engine may be a learning model based on a neural network, or may be any other type of the learning model such as a support vector machine, or may be a learning model that is a combination of them. For example, when the above-described inference engine has an architecture based on the neural network, the parameter storage unit 22 stores information on various parameters such as the layer structure of the inference engine, the neuron structure of each layer, the number of filters and the filter size in each layer, and the weight of each element of each filter. In some embodiments, the learning model of the inference engine may include a neural network architecture having a convolution layer. Thereby, as will be described later, it is possible to grasp an appropriate correspondence relation of the tracking target objects in consideration of all possible combinations of the tracking target objects among the images.

Figure 2B:
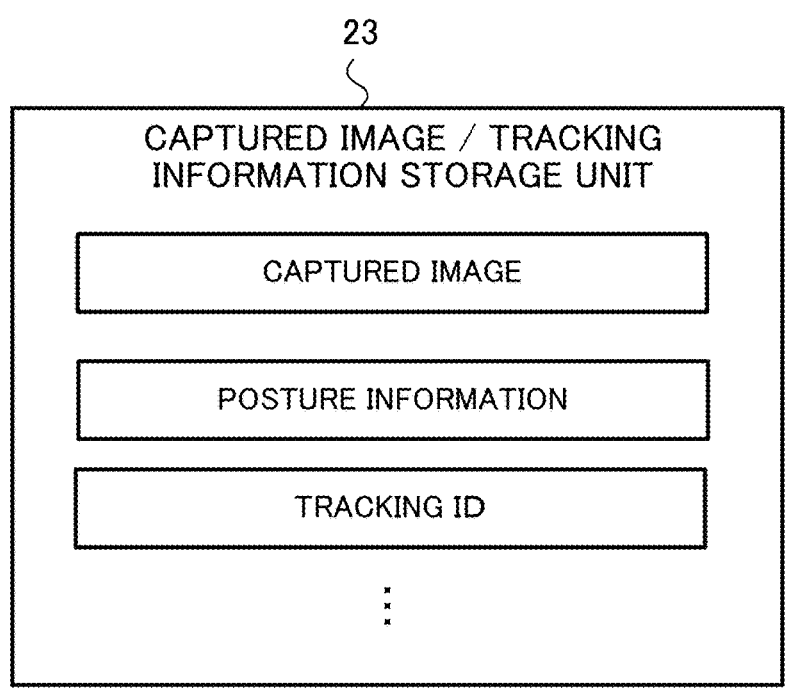
FIG. 2B illustrates an example of the data structure of data stored by a captured image/tracking information storage unit.

The captured image/tracking information storage unit 23 stores captured images used for tracking and information on the tracking results obtained from the captured images. FIG. 2B shows an example of the data structure of the data to be stored by the captured image/tracking information storage unit 23. As shown in FIG. 2B, the captured image/tracking information storage unit 23 at least stores time series captured images, the posture information, and the tracking ID.

The captured images are images generated by the camera 4 on a time series basis. For example, the storage device 2 receives an image to be sequentially transmitted from the camera 4, and stores the received images as a time-series captured images in the captured image/tracking information storage unit 23. The process of storing the images generated by the camera 4 in the captured image/tracking information storage unit 23 may be performed through the learning device 1 or any other device such as the tracking device 3. Then, each tracking target object shown in each image of the time series captured images is associated by the tracking device 3 with the following posture information and the tracking ID.

The posture information is information indicating the posture, in each image, of the tracking target object shown in each image of the time series captured images. The posture information includes information indicating the positions, in the image, of the feature points of the tracking target object shown in each image of the time series captured images. The tracking ID is the identification information assigned to each tracking target object shown in the time series captured images by the tracking device 3. It is noted that the tracking ID may not be consistent with the tracking ID included in the tracking training data. In other words, even when there is a tracking target object in the time series training images identical to a tracking target object in the time series captured images, the same tracking ID need not be assigned to the tracking target object in the time series captured images as the tracking target object shown in the time series training images.

(3) Hardware Configuration

Next, the hardware configuration of the learning device 1 and the tracking device 3 will be described.

Figure 3A:
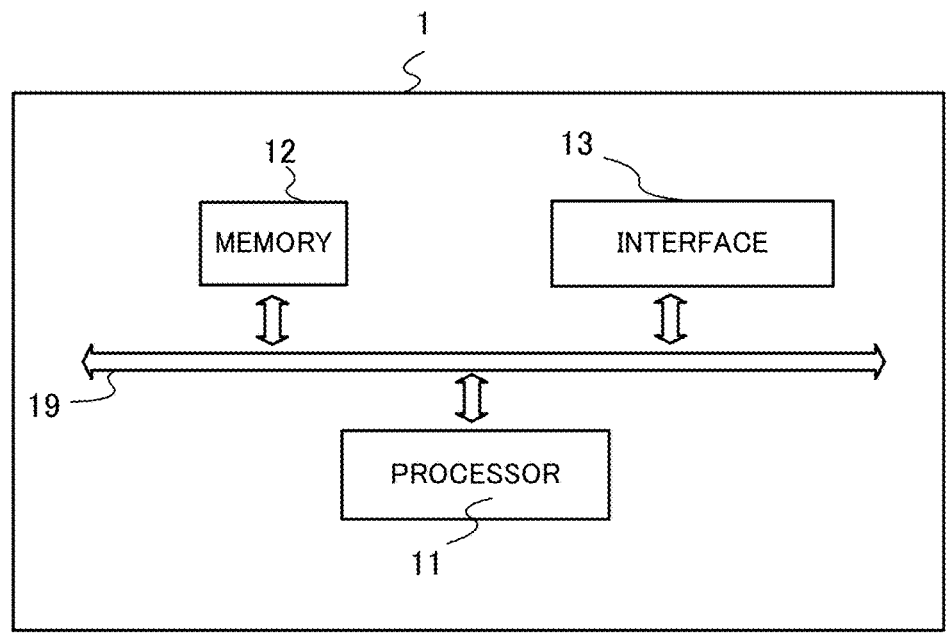
FIG. 3A illustrates an example of the hardware configuration of a learning device.

FIG. 3A illustrates an example of a hardware configuration of the learning device 1. The learning device 1 includes a processor 11, a memory 12, and an interface 13 as hardware. The processor 11, memory 12, and interface 13 are connected to one another via a data bus 19.

The processor 11 functions as a controller (arithmetic device) configured to control the entire learning device 1 by executing a program stored in the memory 12. Examples of the processor 11 include a CPU (Central Processing Unit), a GPU (Graphics Processing Unit), a TPU (Tensor Processing Unit, and a quantum processor. The processor 11 may be configured by a plurality of processors. The processor 11 is an example of a computer.

The memory 12 comprises a variety of volatile and non-volatile memories, such as a RAM (Random Access Memory), a ROM (Read Only Memory), and a flash memory. Further, a program for executing a process executed by the learning device 1 is stored in the memory 12. A part of the information stored in the memory 12 may be stored by one or more external storage devices such as a storage device 2 that can communicate with the learning device 1, or may be stored by a detachable storage medium for the learning device 1. The memory 12 may also store information to be stored by the storage device 2 instead.

The interface 13 is one or more interfaces for electrically connecting the learning device 1 to other devices. Examples of these interfaces include a wireless interface, such as a network adapter, for wirelessly transmitting and receiving data to and from other devices, and a hardware interface, such as cables, for connecting to other devices.

Figure 3B:
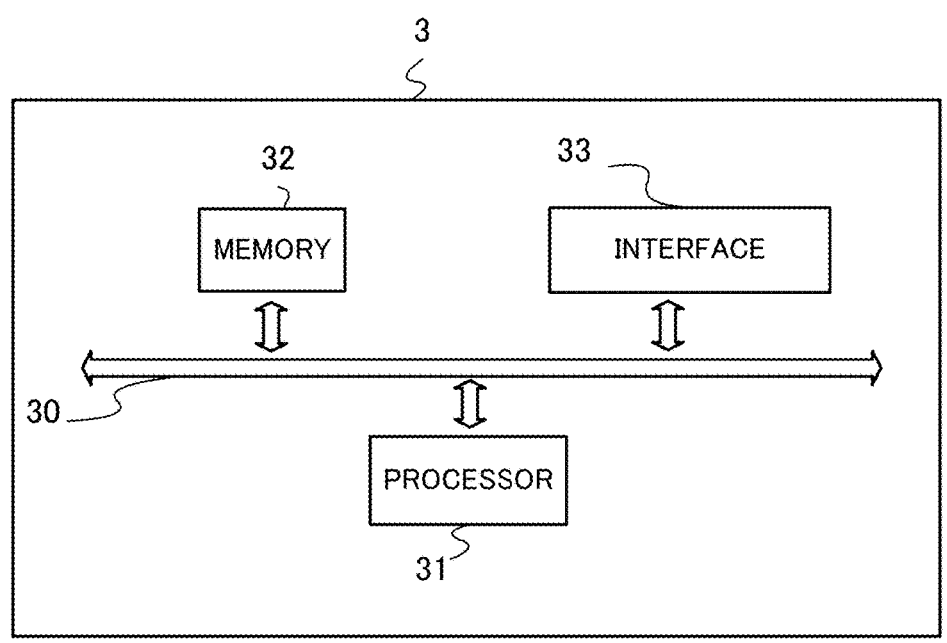
FIG. 3B illustrates an example of the hardware configuration of a tracking device.

FIG. 3B shows an example of a hardware configuration of the tracking device 3. The tracking device 3 includes a processor 31, a memory 32, and an interface 33 as hardware. The processor 31, the memory 32, and the interface 33 are connected to one another via a data bus 30.

The processor 31 functions as a controller (arithmetic device) for performing overall control of the tracking device 3 by executing a program stored in the memory 32. The processor 31 is, for example, one or more processors such as a CPU, a GPU, a TPU, and a quantum processor. The processor 31 may be configured by a plurality of processors. The processor 31 is an example of a computer.

The memory 32 may include a variety of volatile and non-volatile memories, such as a RAM, a ROM, a flash memory, and the like. The memory 32 also stores a program for the tracking device 3 to execute the process. A part of the information stored in the memory 32 may be stored by one or more external storage devices such as the storage device 2 that can communicate with the tracking device 3, or may be stored by a detachable storage medium for the tracking device 3. The memory 32 may store the information to be stored by the storage device 2 instead.

The interface 33 is one or more interfaces for electrically connecting the tracking device 3 to other devices. Examples of these interfaces include a wireless interface, such as a network adapter, for wirelessly transmitting and receiving data to and from other devices, and a hardware interface, such as a cable, for connecting to other devices.

The hardware configurations of the learning device 1 and the tracking device 3 are not limited to the configurations shown in FIG. 3A and FIG. 3B. For example, at least one of the learning device 1 or the tracking device 3 may further include a display unit such as a display, an input unit such as a keyboard and a mouse, a sound output unit such as a speaker, and the like.

(4) Functional Block

Next, a functional configuration of the tracking system 100 will be described.

(4-1) Learning Device

Figure 4:
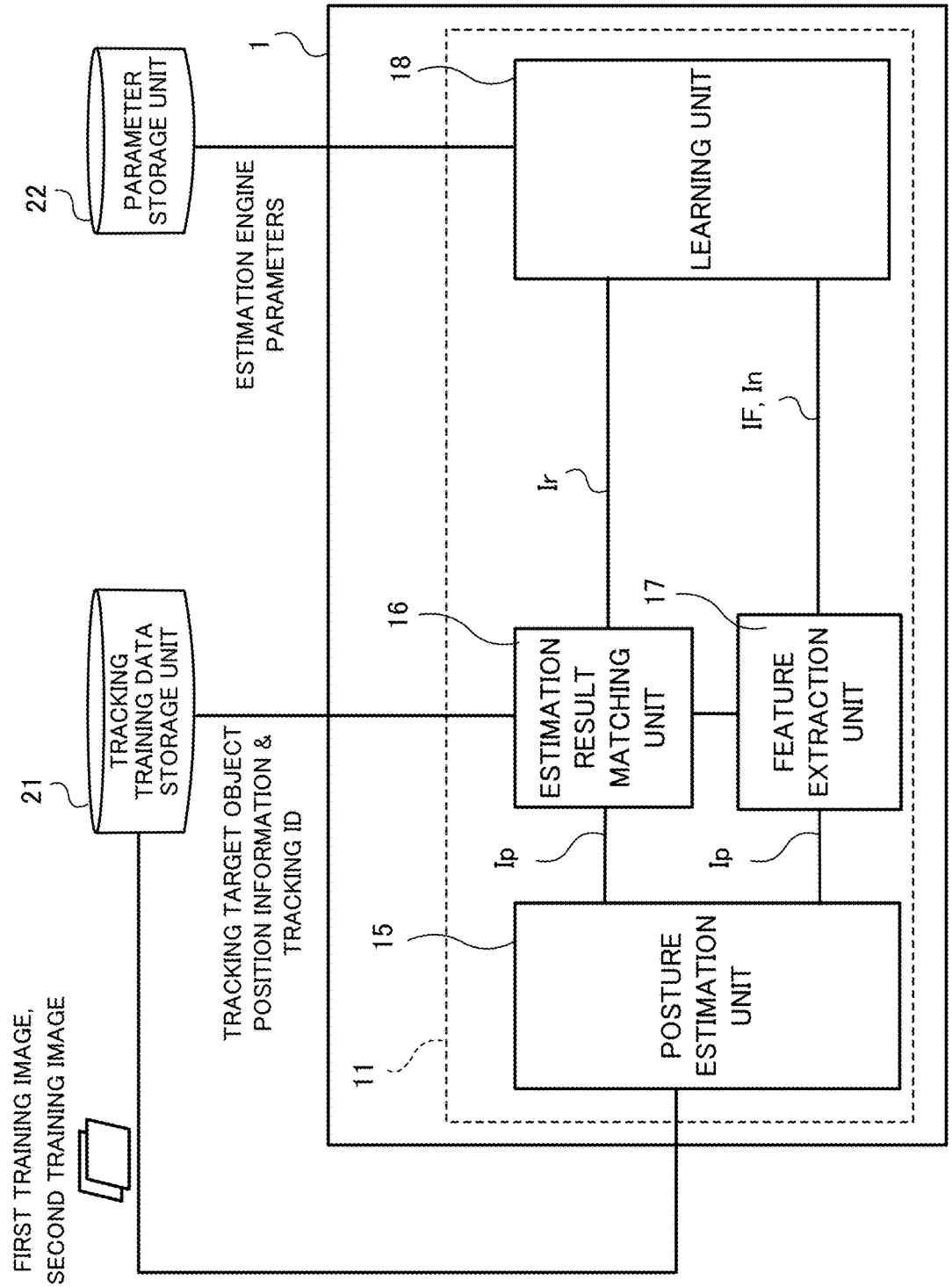
FIG. 4 illustrates an example of a functional block of the learning device.

FIG. 4 is an example of the functional block of the learning device 1. As shown in FIG. 4, the processor 11 of the learning device 1 functionally includes a posture estimation unit 15, an estimation result matching (comparison) unit 16, a feature extraction unit 17, and a learning unit 18. In FIG. 4, any two blocks which transmit and receive data to and from each other are connected by a solid line, but the combinations of the blocks which transmit and receive data is not limited to FIG. 4. The same applies to the drawings of other functional blocks described below.

The posture estimation unit 15 extracts two training images in time series from the tracking training data storage unit 21 through the interface 13 and detects one or more tracking target objects from the extracted images and estimates the postures of the detected tracking target objects. In this case, for example, the posture estimation unit 15 sequentially extracts two images from the time series training images stored in the tracking training data storage unit 21 in chronological order of the shooting time, and processes the extracted images, respectively. Hereinafter, for convenience of explanation, a description will be given of the process when a first training image whose shooting time is "t-8" and a second training image whose shooting time is "t" are extracted from the tracking training data storage unit 21. The signs "t" and "8" are natural numbers.

The posture estimation unit 15 applies any posture estimation technique to the first training image and the second training image thereby to generate the posture information "Ip" indicating a plurality of feature points of the tracking target objects included in the images to be processed. The method for estimating the posture information indicating a plurality of feature points from an input image is disclosed in Patent Literature 1, for example. For example, when the parameters of a posture estimation engine learned in advance based on deep learning or the like are stored in the storage device 2 or the memory 12, the posture estimation unit 15 may use the posture estimation engine configured by referring to the stored parameters. In this instance, the posture estimation unit 15 acquires, as the posture information Ip, information on the feature points of each tracking target object which is outputted from the posture estimation engine by inputting the first training image and the second training image into the posture estimation engine, respectively. The posture estimation unit 15 supplies the generated posture information Ip to the estimation result matching unit 16 and the feature extraction unit 17, respectively.

The estimation result matching unit 16 extracts the tracking target object position information and the tracking ID regarding the tracking target objects included in the first training image and the second training image from the tracking training data storage unit 21 and compares the extracted tracking target object position information with the posture information Ip supplied from the posture estimation unit 15. Thereby, for each posture information Ip indicating the posture of each tracking target object included in the first training image and the second training image, the estimation result matching unit 16 associates the posture information Ip with the tracking ID corresponding to the tracking target object position information most matched with the posture information Ip. In this case, in some embodiments, in consideration of the possibility that the posture estimation engine cannot detect a tracking target object and the possibility that an object that is not registered in the training dataset can be detected, the estimation result matching unit 16 may perform the association of the tracking ID corresponding to the most matched tracking target object position information only for the posture information Ip that satisfies one or more predetermined criteria. Here, examples of the "predetermined criteria" include:

(1) at least the number "N" (N is a positive integer) of the detected feature points are included in the correct rectangular area;

(2) the distance between the correct feature point and the predicted feature point is equal to or shorter than "L" (L is a positive number).

The information regarding "N" and "L" is, for example, previously stored in the memory 12 or storage device 2. In this case, the posture information Ip which is not associated with the tracking ID because the predetermined criteria are not satisfied is not used in the processing to be executed by the learning unit 18. The estimation result matching unit 16 supplies the learning unit 18 with information (also referred to as "tracking association information Ir") which associates the posture information Ip with the tracking ID. For example, when a serial number (e.g., detection number described below) for identifying the posture information Ip for each tracking target object in each image is assigned to the posture information Ip for each tracking target object, the tracking association information Ir may be table information indicating the correspondence between the serial number and the tracking ID for each image. Details of the matching process between the tracking target object position information and the posture information Ip by the estimation result matching unit 16 will be described in detail in the section "(5) Matching of Estimation Results".

The feature extraction unit 17 generates information (also referred to as "feature information IF") representing the features of each tracking target object based on the posture information Ip supplied from the posture estimation unit 15. The feature information IF is equivalent to information into which the posture information Ip is converted and which conforms to the input format of the inference engine. As will be described later, the feature extraction unit 17 generates the feature information IF which has a format based on the number of detections of the tracking target objects in the first training image, the number of detections of the tracking target objects in the second training image, and the number of the feature points of each tracking target object (that is, the number of types of the feature points to be detected). The feature extraction unit 17 supplies the generated feature information IF to the learning unit 18. The feature information IF is described in detail in the section "(6) Generation of Feature Information and Matrix Information". In addition, the feature extraction unit 17 supplies the learning unit 18 with information indicating the correspondence relation between the detection number, which is assigned to each tracking target object for each image as described later, and the tracking ID.

The learning unit 18 learns the inference engine on the basis of the tracking association information Ir supplied from the estimation result matching unit 16 and the feature information IF supplied from the feature extraction unit 17, and stores parameters of the inference engine obtained by the learning in the parameter storage unit 22. In this instance, the learning unit 18 recognizes the correct answer correspondence relation of the tracking target object between the first training image and the second training image based on the tracking association information Ir. Then, the learning unit 18 learns the inference engine by using the feature information IF as input data inputted to the inference engine and using the correspondence information Ic indicating the correct answer correspondence relation as correct answer data to be outputted by the inference engine. In this case, the learning unit 18 learns the inference engine such that the loss (error) of the inference result, which is outputted by the inference engine when the input data is inputted to the inference engine, from the correct answer data is minimized. The algorithm for determining the parameters to minimize the loss may be any learning algorithm used in machine learning, such as gradient descent and error back propagation. The learning by the learning unit 18 will be described in detail in the section "(6) Generation of Feature Information and Matrix Information".

Each component (the posture estimation unit 15, the estimation result matching unit 16, the feature extraction unit 17, and the learning unit 18) of the processor 11 described in FIG. 4 can be realized, for example, by the processor 11 executing a program. The necessary programs may be recorded on any non-volatile storage medium and installed as necessary to realize each component. It should be noted that at least a portion of these components may be implemented by any combination of hardware, firmware, and software, or the like, without being limited to being implemented by software based on a program. At least some of these components may also be implemented using user programmable integrated circuit such as FPGA (Field-Programmable Gate Array) and microcontrollers. In this case, an integrated circuit may be used to realize a program to function as each of the above components. Further, at least a part of the components may be constituted by ASSP (Application Specific Standard Produce) or ASIC (Application Specific Integrated Circuit). Thus, each of the above-described components may be realized by various hardware. Furthermore, each of these components may be implemented by the cooperation of a plurality of computers, for example, using cloud computing technology. The above explanation is true in other example embodiments described later.

(4-2) Tracking Device

Figure 5:
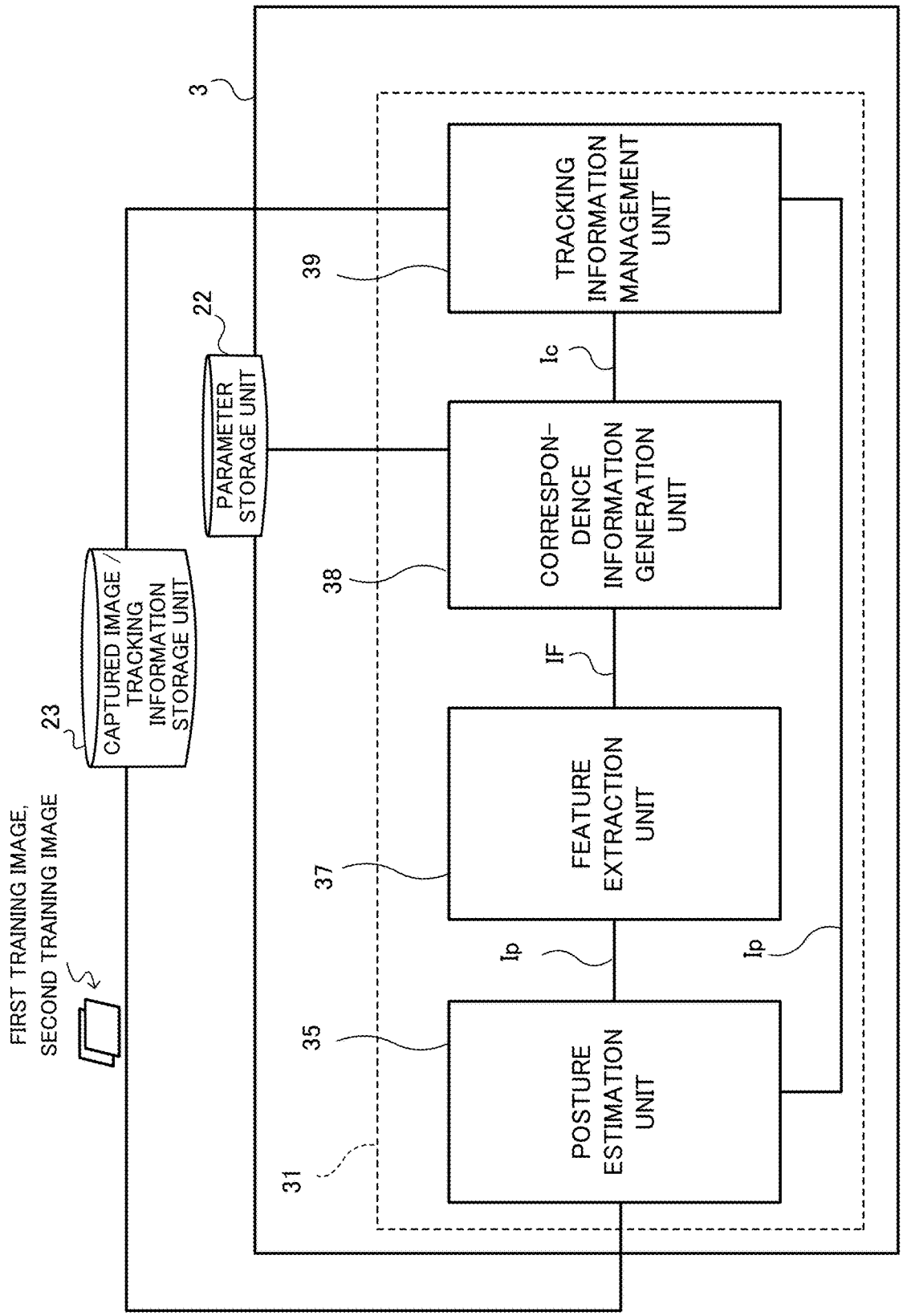
FIG. 5 illustrates an example of the functional block of the tracking device.

FIG. 5 is an example of a functional block of the tracking device 3. As shown in FIG. 5, the processor 31 of the tracking device 3 functionally includes a posture estimation unit 35, a feature extraction unit 37, a correspondence information generation unit 38, and a tracking information management unit 39.

The posture estimation unit 35 extracts two captured images in time series from the captured image/tracking information storage unit 23 through the interface 33 and performs detection of one or more tracking target objects and estimation of the postures of the detected tracking target objects for each extracted captured image. Hereafter, the two captured images in time series extracted from the captured image/tracking information storage unit 23 by the posture estimation unit 35 in chronological order of the shooting time are referred to as "first captured image" and "second captured image", respectively. Then, the posture estimation unit 35 generates posture information Ip indicating a plurality of feature points of the tracking target objects shown in the first captured image and the second captured image, respectively, by applying any posture estimation technique to the first captured image and the second captured image. The posture estimation unit 35 supplies the generated posture information Ip to the feature extraction unit 37 and the tracking information management unit 39, respectively.

Here, a supplementary description will be given of the selection of the first captured image and the second captured image to be processed by the tracking device 3. For example, the tracking device 3 selects the image, which was selected as the second captured image in preceding process followed by current process, as the first captured image in the current process, and selects the image captured after the first captured image as the second captured image. In this way, the tracking device 3 selects the first captured image and the second captured image from time series captured images in sequence with overlap of one image. Thereby, the tracking device 3 tracks the tracking target objects shown in the captured image group in time series having any photographing time length. It is noted that the tracking device 3 may select the first captured image and the second captured image from the time series captured images stored in the captured image/tracking information storage unit 23 in sequence so that an interval equivalent to a predetermined number of images is made between the first captured image and the second captured image.

The feature extraction unit 37 generates the feature information IF based on the posture information Ip supplied from the posture estimation unit 35. Since the process to be executed by the feature extraction unit 37 is the same as the process to be executed by the feature extraction unit 17, the description thereof will be omitted.

The correspondence information generation unit 38 configures the inference engine learned by the learning device 1 based on the parameters extracted from the parameter storage unit 22, and inputs the feature information IF to the configured inference engine, thereby generating the correspondence information Ic indicating the corresponding relation of the tracking target objects between the first captured image and the second captured image. The correspondence information generation unit 38 supplies the generated correspondence information Ic to the tracking information management unit 39.

Based on the correspondence information Ic supplied from the correspondence information generation unit 38, the tracking information management unit 39 associates the tracking ID with the posture information Ip supplied from the posture estimation unit 35 and stores the associated posture information Ip in the captured image/tracking information storage unit 23. In this case, the tracking information management unit 39 issues (newly adds), updates, or deletes the tracking ID. For example, if there is a tracking target object to which the tracking ID is not assigned in the first captured image or the second captured image, the tracking information management unit 39 issues a new tracking ID to the tracking target object. Then, the tracking information management unit 39 stores the posture information Ip of the tracking target object in association with the newly issued tracking ID in the captured image/tracking information storage unit 23. In another example, when a tracking target object that was present in the first captured image does not appear in the second captured image, the tracking information management unit 39 deletes the tracking ID assigned to the tracking target that was present in the first captured image.

Here, the tracking ID does not need to be a unique ID for each tracking target object, and it is only required that a common tracking ID is assigned to a tracking target object in such a shooting duration that the tracking target object continuously exists within the shooting target area of the camera 4. For example, when a tracking target object disappears from the shooting target range of the camera 4 and then appears the shooting target range again, the tracking information management unit 39 may assign a different tracking ID to the tracking target object which has appeared again.

On the other hand, the tracking information management unit 39 may manage the assignment of the tracking ID so that each tracking target object has a unique ID. In this instance, the tracking information management unit 39 stores the feature information (e.g., the feature information of the face) for identifying the tracking target object in the captured image/tracking information storage unit 23 in advance and, by referring to the feature information, determines whether or not the tracking ID has already been assigned to a tracking target object which appears in the second captured image without being present in the first captured image. In this instance, the tracking information management unit 39 may perform identification of the tracking target object using any technique used in Re-Identification (ReID).

Each component (the posture estimation unit 35, the feature extraction unit 37, the correspondence information generation unit 38, and the tracking information management unit 39 described in FIG. 5) of the processor 31 described in FIG. 5 can be realized, for example, by the processor 11 executing a program. The necessary programs may be recorded on any non-volatile storage medium and installed as necessary to realize each component. It should be noted that at least a portion of these components may be implemented by any combination of hardware, firmware, and software, or the like, without being limited to being implemented by software based on a program. At least some of these components may also be implemented using user programmable integrated circuit such as FPGA and microcontrollers. In this case, an integrated circuit may be used to realize a program to function as each of the above components. Further, at least a part of the components may be constituted by ASSP or ASIC. Thus, each of the above-described components may be realized by various hardware. Furthermore, each of these components may be implemented by the cooperation of a plurality of computers, for example, using cloud computing technology. The above explanation is true in other example embodiments described later.

(5) Matching of Estimation Results

Next, the process executed by the estimation result matching unit 16 will be described in detail. Hereafter, a description will be given of a first case where the tracking target object position information indicates the existence areas of tracking target objects in the first training image and the second training image and a second case where the tracking target object position information indicates the positions of the feature points of the tracking target objects in the first training image and the second training image (i.e., the tracking target object position information is equivalent to the posture information).

Figure 6:
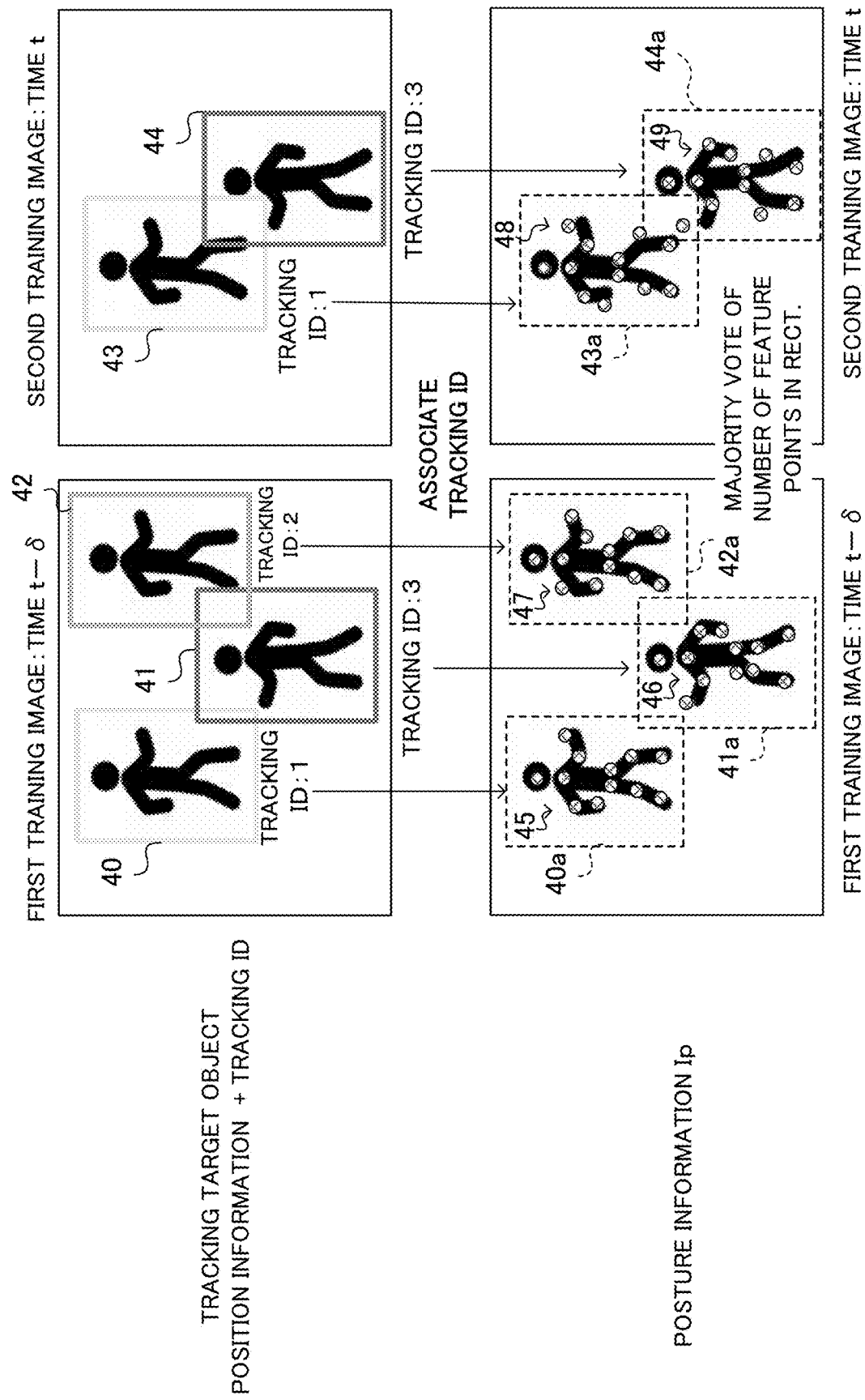
FIG. 6 is a diagram showing an outline of a matching process when the tracking target object position information indicates the existence area of each tracking target object shown in a first training image and a second training image.

FIG. 6 is a diagram illustrating an outline of a matching process performed by the estimation result matching unit 16 in the case where the tracking target object position information indicates the existence areas of tracking target objects in the first training image and the second training image. Here, it is assumed that a tracking target object is a person and that there are pedestrians to which the tracking ID "1" to "3" are assigned, respectively, in the first training image and that there are pedestrians to which tracking ID "1" and tracking ID "3" are assigned, respectively, in the second training image.

The upper part in FIG. 6 shows the first training image and the second training image with clear indication of the tracking target object position information and the tracking ID stored in the tracking training data storage unit 21. In the upper part of FIG. 6, the existence areas of the tracking target objects indicated by the tracking target object position information are clearly indicated on the first training image and the second training image by the rectangular frames 40 to 44. In addition, the lower part of FIG. 6 shows the first training image and the second training image in which the positions of the feature points (in this case, joint points) indicated by the posture information Ip are specified. In the lower part of FIG. 6, the positions of the joint points estimated for each tracking target object are clearly indicated on the first training image and the second training image by the estimated joint point groups 45 to 49 for respective tracking target objects. In the lower part of FIG. 6, the dashed rectangular frames 40a to 44a arranged at the same position as the rectangular frames 40 to 44 are clearly indicated on the first training image and the second training image.

In this instance, the estimation result matching unit 16 generates the tracking association information Ir based on the positional relation between the estimated joint point groups 45 to 49 indicating the estimated positions of the joint points of the respective tracking target objects indicated by the posture information Ip and the rectangular frames 40*a* to 44*a* indicating the existence areas of the tracking target objects indicated by the tracking target object position information. Specifically, for each of the estimated joint point groups 45 to 49, the estimation result matching unit 16 selects, by majority vote, one rectangular frame, which includes the most estimated joint points of the estimated joint point group, from the rectangular frames 40*a* to 44*a*. For example, since all the twelve joint points indicated by the estimated joint point group 45 are included in the rectangular frame 40*a*, the estimation result matching unit 16 associates the estimated joint point group 45 with the tracking ID "1" corresponding to the rectangular frame 40*a* determined by majority vote. In the same way, for each of the estimated joint point groups 46 to 49, the estimation result matching unit 16 performs majority vote of the number of the joint points included in each rectangular frame of each training image, and thereby associates the tracking ID "3", "2", "1", "3" with the estimated joint point groups 46 to 49, respectively. Then, the estimation result matching unit 16 generates the tracking association information Ir indicating the association results of the tracking ID for all of the estimated joint point groups 45 to 49.

As described above, when the tracking target object position information indicates existence areas of the tracking target objects, the estimation result matching unit 16 can suitably generate the tracking association information Ir. It is noted that each existence area of the tracking target objects indicated by the tracking target object position information is not limited to a rectangular area and that it may be an area with arbitrary shape. In some embodiments, taking into account the possibility that the posture estimation engine cannot detect the tracking target object and/or the posture estimation engine detects an object that does not exist in the training data set, the estimation result matching unit 16 may apply the association process of the tracking ID only for the posture information Ip that satisfies the above-described "predetermined criteria".

FIG. 7 is a diagram illustrating an outline of a matching process performed by the estimation result matching unit 16 in the case where the tracking target object position information indicates the positions of the feature points of the tracking target objects in the first training image and the second training image. The first training image and the second training image shown in FIG. 7 are identical to the first training image and the second training image shown in FIG. 6, respectively.

In the upper part in FIG. 7, the positions of the joint points of the tracking target objects indicated by the tracking target object position information are specified on the first training image and the second training image by the point groups 50 to 54 for respectively tracking target objects.

In this case, the estimation result matching unit 16 generates the tracking association information Ir based on the positional relation between the estimated joint point groups 45 to 49 indicating the estimated positions of the joint points of the respective tracking target objects indicated by the posture information Ip and the correct answer joint point groups 50 to 54 indicating the correct answer positions of the joint points of the respective tracking target objects indicated by the tracking target object position information. Specifically, for each tracking target object shown in each training image, the estimation result matching unit 16 calculates the sum of the distances between the correct answer joint point groups indicated by the tracking target object position information and the corresponding joint points of each of the estimated joint point groups, and associates the tracking ID of the each tracking target object with the estimated joint point group having the smallest sum. For example, when specifying the estimated joint point group to be associated with the tracking ID "1" in the first training image, the estimation result matching unit 16 calculates the sum of the distance, per joint point, between the correct answer joint point group 50 corresponding to the tracking ID "1" and each of the estimated joint point groups 45 to 47 in the first training image. Then, the estimation result matching unit 16 associates the tracking ID "1" corresponding to the correct joint point group 50 with the estimated joint point group 45 having the smallest sum. In the same way, the estimation result matching unit 16 specifies one of the estimated joint point groups 46 to 49 in which the above-mentioned sum is the smallest for each correct answer joint point groups 51 to 54, and thereby associates the tracking ID "3", "2", "1", and "3" with the estimated joint point groups 46 to 49, respectively. Then, the estimation result matching unit 16 generates the tracking association information Ir based on the association results of the tracking ID for all of the estimated joint point groups 45 to 49.

In this way, even when the tracking target object position information indicates the posture information of the respective tracking target objects, the estimation result matching unit 16 can suitably generate the tracking association information Ir. In some embodiments, taking into account the possibility that the posture estimation engine cannot detect the tracking target object and/or the posture estimation engine detects an object that does not exist in the training data set, the estimation result matching unit 16 may apply the association process of the tracking ID only for the posture information Ip that satisfies the above-described "predetermined criteria".

(6) Generation of Feature information and Matrix Information (6-1) Outline

FIG. 8 is a schematic diagram illustrating a process of generating the feature information IF and the correspondence information Ic that are executed by the training device 1 and the tracking device 3. First, a description will be given of the process to be performed by the learning device 1.

The feature extraction unit 17 of the training device 1 generates the feature information IF obtained by converting the posture information Ip supplied from the posture estimation unit 15 into data according to a predetermined tensor format. In FIG. 8, as the posture information Ip, the joint points of the pedestrians to be tracked are clearly indicated on the image (first training image) having the shooting time t-8 and the image (second training image) having the shooting time t. In addition, here, for convenience of explanation, the detection numbers "1" to "3" and "1*a*" to "2*a*" are assigned to the respective tracking target objects shown in each image. The detection number is, for example, a number assigned to each tracking target object based on a predetermined rule (e.g., based on the distance between the center coordinate of each tracking target object and the origin in the image), and may not be consistent with the tracking ID.

As shown in FIG. 8, the feature information IF indicates the x-coordinate values and the y-coordinate values, in each image, of feature points (including a head, a right hand and the like in this case) of the tracking target objects according to the format based on the number of types of the feature points and the respective numbers of the detected tracking target object in the first training image and in the second training image. The term "coordinate value" described above may be a value representing a horizontal or vertical position in pixel units, or may be a value indicating a horizontal or vertical position in sub-pixel units. The format of the feature information IF will be described later.

Then, the learning unit 18 inputs the feature information IF generated by the feature extraction unit 17 to the inference engine. In this case, the inference engine outputs a correspondence matrix in which the correspondence between the tracking target objects in the first training image and the tracking target objects in the second training image is indicated with the probability. Then, the learning unit 18 determines the parameters of the inference engine so that the loss (error) between the outputted correspondence matrix and the correct answer correspondence matrix generated based on the tracking association information Ir is minimized.

Here, in some embodiments, the model to be learned as the inference engine is a model based on a convolutional neural network (CNN: Convolutional Neural Network) or the like. As described above, by training the convolutional neural network as the inference engine, the existence of the convolution layer thereof enables the inference engine to accurately grasp the correspondence relation of the tracking target objects among images considering all possible combination of the tracking target objects.

In some embodiments, the detection number may be a number randomly assigned based on a pseudo-random number. Thereby, it is possible to prevent an error in the learning stage due to the correspondence matrix to be set as the correct answer having the same component arrangement (e.g., diagonal matrix).

Here, a supplementary description will be given of the process in a case where the detection number is set to be a randomly assigned number based on a pseudo-random number. In this case, the learning device 1 performs the following four steps.

First Step. The feature extraction unit 17 assigns a number (referred to as "temporary detection number") to each detected posture information Ip according to a predetermined rule (e.g., in ascending order of the distance to the origin on the image).

Step 2. The estimation result matching unit 16 associates the temporary detection number with the tracking ID and generates the tracking association information Ir.

Step 3. The feature extraction unit 17 generates a detection number that is randomly assigned, and generates correspondence information (also referred to as "number correspondence information In") between the temporary detection number generated at Step 1 and the detection number that was randomly assigned. In this instance, the feature extraction unit 17 generates the feature information IF that indicates the matrix to be inputted to the inference engine by arranging the information on the basis of the randomly-assigned detection number.

Step 4. The learning unit 18 associates the detection number which was randomly assigned with the tracking ID using the tracking association information Ir and the number correspondence information In, and generates the correct answer correspondence matrix.

Next, a process of generating the feature information IF and the correspondence information Ic by the tracking device 3 will be described. The feature extraction unit 37 of the tracking device 3 generates feature information IF in a predetermined tensor format into which the posture information Ip generated on the basis of the first captured image and the second captured image is converted. The feature information IF indicates the x-coordinate values and the y-coordinate values, in each image, of feature points of the tracking target objects according to the format based on the number of types of the feature points and the respective numbers of the detected tracking target objects in the first training image and in the second training image.

Then, the correspondence information generation unit 38 configures the inference engine by referring to the parameter storage unit 22, and inputs the feature information IF generated by the feature extraction unit 37 to the inference engine. Thus, the inference engine outputs a correspondence matrix indicating the probability of the correspondence between the tracking target object(s) in the first captured image and the tracking target object(s) in the second captured image. The correspondence information generation unit 38 supplies the correspondence information Ic indicative of the correspondence matrix to the tracking information management unit 39.

(6-2) Format of Feature Information

Next, the data structure (format) of the feature information IF will be described. The data-structure of the feature information IF may be either the first type or the second type described below. Hereinafter, "first image" and "second image" indicate either a set of the first training image and the second training image, or a set of the first captured image and the second captured image, for convenience of explanation, since the format of the feature information IF used by the learning device 1 is the same as the format of the feature information IF used by the tracking device 3.

The first format is the format of the feature information IF shown in FIG. 8. The first format indicates the following tensor format provided that the number of detected tracking target objects in the first image is "N", the number of detected tracking target objects in the second image is "M", the number of images of interest is "TF", the number of types of the feature points (joint points) is "K", and the number of dimensions of the image is "D".

$$N \times M \times (TF \times K \times D)$$

Here, "TF" becomes "2" because the number of images of interest is two (the first image and the second image), and "D" becomes "2" because the dimensions of the image is two-dimensions with the x-coordinate and y-coordinate. Further, in FIG. 8, the number of detections N of the tracking target objects in the first image is 3, the number of detections M of the tracking target objects in the second image is 2. Further, here, as an example, "N×M" is assumed to correspond to the size of the matrix, (TF×K×D) is assumed to correspond to the size in the channel direction.

FIG. 9A shows a matrix according to the first format in the channel corresponding to the coordinate values of the feature points (x coordinate values of the head in this case) in the first image, FIG. 9B shows a matrix according to the first format in the channel corresponding to the coordinate values of the feature points (x coordinate values of the head in this case) in the second image. The matrices shown in FIGS. 9A and 9B are matrices in which the number of rows corresponds to the number of detections N of the tracking target objects in the first image and in which the number of columns corresponds to the number of detections M of the tracking target objects in the second image. Then, each row of the matrix shown in FIG. 9A correspond to the detection number of the tracking target object in the first image in order, and stores the coordinate values of the feature point of the tracking target object according to the corresponding detection number. Further, the matrix shown in FIG. 9A stores common values for each column (i.e., same values are stored in the same row). On the other hand, each column of the matrix shown in FIG. 9B corresponds to the detection number of the tracking target object in the second image in order, and stores the coordinate values of the feature point of the tracking target object according to the corresponding detection number. Further, the matrix shown in FIG. 9B stores common values for each row (i.e., same values are stored in the same column).

Thus, the feature information IF according to the first format is equivalent to information including the x-coordinate and y-coordinate of all the feature points of all the tracking target objects detected in the first image and the second image, and is suitably used as data to be inputted to the inference engine.

Here, a supplementary explanation will be given of the coordinate system that defines the coordinate values of the feature points to be stored as elements of the feature information IF.

Figure 10A:
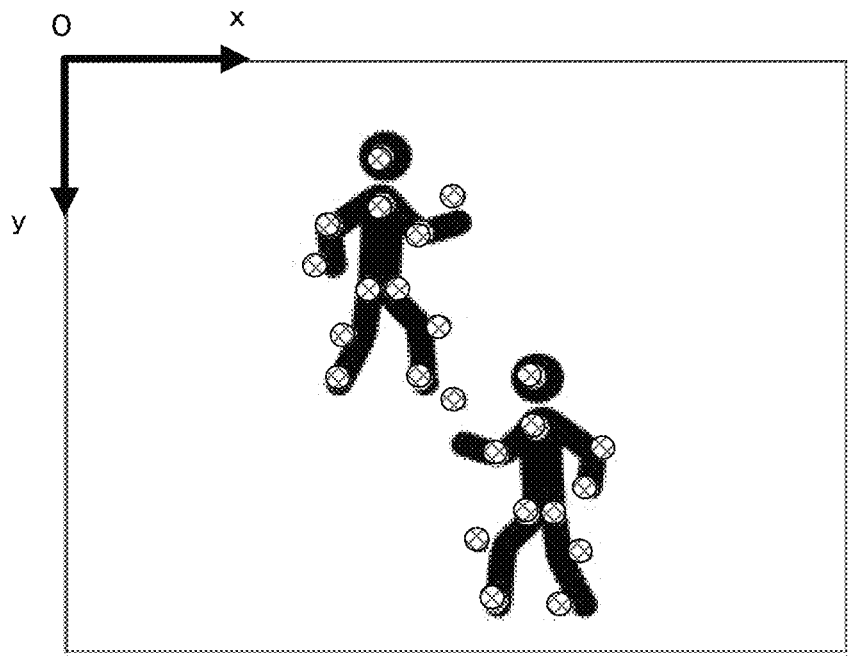
FIG. 10A illustrates a first example of the coordinate system which defines coordinate values of the feature points.
Figure 10B:
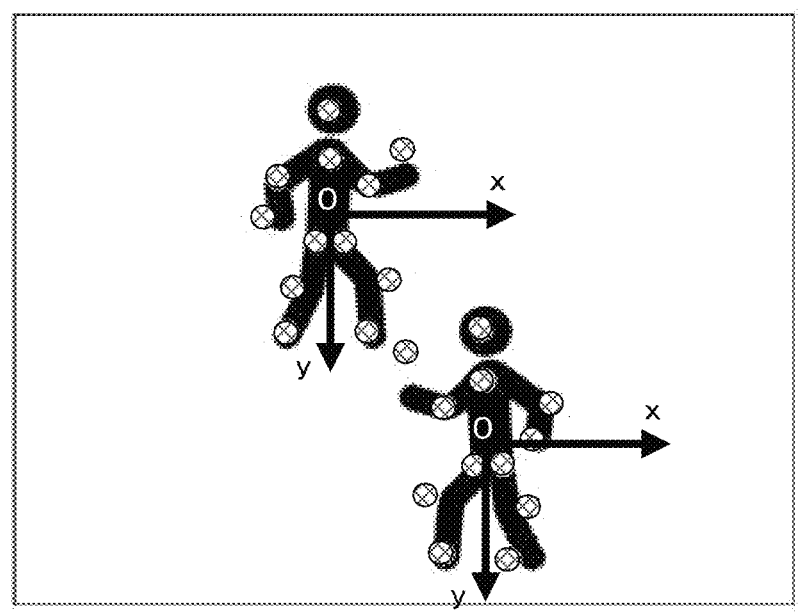
FIG. 10B illustrates a second example of the coordinate system which defines coordinate values of the feature points.

The coordinate values of each feature point may be coordinate values in a coordinate system (an absolute coordinate system in an image) defined with reference to a predetermined position of an image, or may be coordinate values in a coordinate system (a relative coordinate system for each tracking target object in an image) defined with reference to the position of each tracking target object. FIG. 10A shows a first example of a coordinate system defining the coordinate values of the feature point, and FIG. 10B shows a second example defining the coordinate values of the feature point. In the example of FIG. 10A, the coordinate values of the feature points are the coordinate values in such coordinate system that a corner (the upper left corner) of the image is used as the origin and that the horizontal direction is set to be the x-coordinate and that the vertical direction is set to be the y-coordinate, and the coordinate system is a common coordinate system for all tracking target objects. In FIG. 10B, there are two tracking target objects, and for each tracking target object, such a coordinate system is set that the horizontal direction is set to be the x-coordinate and that the vertical direction is set to be the y-coordinate and that the center point (the center of gravity of the feature points) of each tracking target object as the origin. In this case, the coordinate values of each feature point are expressed by the offset from the origin which is determined for each tracking target object.

Next, the second format of the feature information IF will be described. The second format is a format in which dimensions corresponding to "TF" are reduced by using the distance of the coordinates of each feature point as an element, and the second format indicates the following tensor form.

$$N \times M \times (K \times D)$$

In the second format, "N×M" corresponds to the size of the matrix, and (K×D) corresponds to the size in the channel direction.

FIG. 11 shows a matrix in a channel corresponding to the x-coordinate value of the head according to the second format of feature information. The matrix shown in FIG. 11 is a matrix in which the number of rows corresponds to the number of detections N of the tracking target objects in the first image and in which the number of columns corresponds to the number of detections M of the tracking target objects in the second image. Further, each element of the matrix shown in FIG. 11 indicates the distance (i.e., the absolute value of the difference) of the coordinate value (x coordinate value) of the target feature point (the head in this case) between the tracking target object shown in the first image corresponding to the row number and the tracking target object shown in the second image corresponding to the column number. In the example of FIG. 11, the row number of the matrix corresponds to the detection number in the first image, and the column number corresponds to the detection number in the second image. Thus, it is possible to express, as a matrix, the distance of the x-coordinate value of the head for all possible pairs of the tracking target object in the first image and the tracking target object in the second image.

Accordingly, the feature information IF according to the second format is equivalent to information generated based on the x-coordinate and y-coordinate of all the feature points of all the tracking target objects detected in the first image and the second image, and therefore it is suitably applied to input data inputted to the inference engine in the same way as the first format.

(6-3) Correspondence Matrix

Next, a specific description will be given of the correspondence matrix that the inference engine outputs.

Figure 12A:
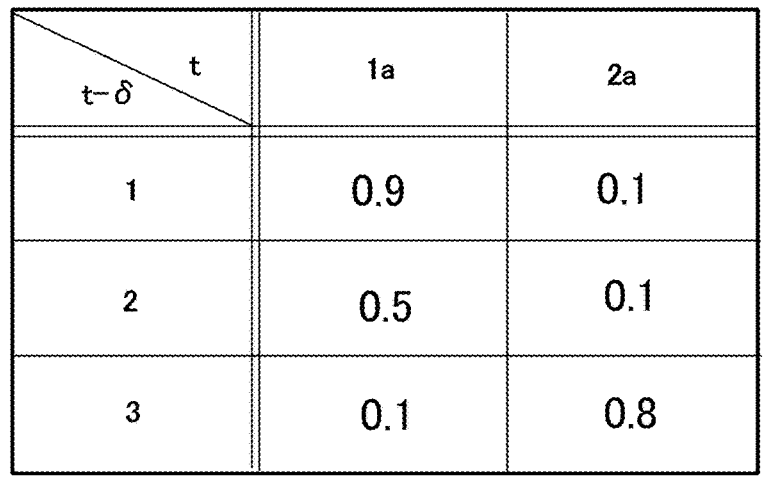
FIG. 12A illustrates a first example of the correspondence matrix which an inference engine outputs when the feature information based on the first image and the second image shown in FIG. 8 is inputted to the inference engine.
Figure 12B:
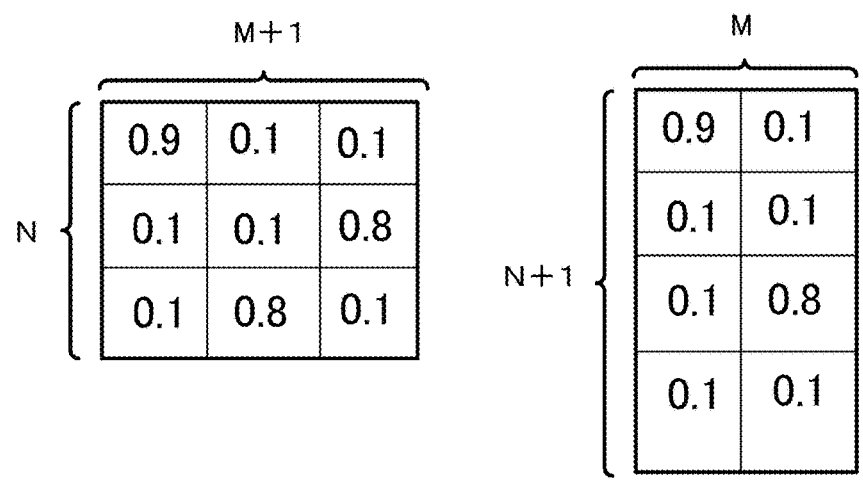
FIG. 12B illustrates a second example of the correspondence matrix which an inference engine outputs when the feature information based on the first image and the second image shown in FIG. 8 is inputted to the inference engine.

FIG. 12A shows a first example of the correspondence matrix to be outputted by the inference engine when the feature information IF based on the first image and the second image shown in FIG. 8 is inputted to the inference engine. Further, FIG. 12B shows a second example of the correspondence matrix to be outputted by the inference engine when the feature information IF based on the first image and the second image shown in FIG. 8 is inputted to the inference engine. Here, the detection numbers "1", "2", and "3" are assigned to the pedestrians shown in the first image, and the detection numbers "1a" and "2a" are assigned to the pedestrians shown in the second image.

In the first example shown in FIG. 12A, the inference engine makes an inference of the presence or absence of the correspondence between the pedestrians having the detection numbers "1" to "3" in the first image and the pedestrians having the detection numbers "1a" and "1b" in the second image, and outputs the inference result that is a correspondence matrix. In this case, the correspondence matrix has a size corresponding to the number of detections N of pedestrians in the first image and the number of detections M of pedestrians in the second image, the row number corresponds to the detection number of the pedestrian in the first image, and the column number corresponds to the detection number of the pedestrian in the second image. Here, the pedestrian having the detection number "1a" in the second image has the highest probability (confidence level) "0.9" of correspondence with the pedestrian having the detection number "1" in the first image. In addition, the pedestrian having the detection number "2a" in the second image has the highest probability "0.8" of correspondence with the pedestrian having the detection number "3" in the first image. The maximum value of elements of the correspondence matrix is not limited to 1, and may be any predetermined value.

According to the correspondence matrix illustrated in FIG. 12A, the tracking information management unit 39 of the tracking device 3 suitably specifies that the same tracking ID should be given to the pedestrian having the detection number "1" and the pedestrian having the detection number "1a", and that the same tracking ID should be given to the pedestrian having the detection number "3" and the pedestrian having the detection number "2a". Specifically, for each tracking target object in the image (in this case, the second image) where the number of detected tracking target objects is small (any one of images if the numbers of detected tracking target objects are the same), the tracking target object in the other image (in this case, the first image) with the highest probability is specified, and the tracking ID identical to the specified tracking target object is set. As a result, the tracking information management unit 39 can suitably specify the tracking target objects to which the same tracking ID should be assigned. For example, when there is a tracking target object appearing only in the first image, the tracking information management unit 39 deletes the tracking ID of the tracking target object, and when there is a tracking target object appearing only in the second image, it issues a new tracking ID of the tracking target object. In the example embodiment of FIG. 12A, the tracking information management unit 39 deletes the tracking ID of the pedestrian having the detection number "2". On the basis of the above-described ReID, when a tracking target object which was once out of the shooting range enters the shooting range again and the same tracking ID is given to the tracking target object, the tracking information management unit 39 stores the tracking ID in the storage unit 2 or the like in association with the information required for identification of the tracking target object without deleting the tracking ID.

As described above, according to the first example, the inference engine is set as a model configured to output a correspondence matrix whose each element indicates the probability that the a tracking target object in the first image correspond to a tracking target object in the second image. Thereby, it enables the inference engine to output information suitable for managing the tracking ID. The correspondence matrix may have such a structure that a matrix whose each element represent the probability of the non-correspondence is added in the channel direction to the matrix in which each element represents the probability of the correspondence. This structural example will be described later with reference to FIGS. 13A to 13C.

In the second example of the correspondence matrix shown in FIG. 12B, the inference engine makes inferences of: the correspondence between the tracking target objects with the detection numbers "1" to "3" in the first image and the tracking target objects with the detection numbers "1a" and "1b" in the second image; and the appearance and disappearance of a tracking target object in the second image. Then, the inference engine outputs two correspondence matrices indicating the inference results. Specifically, the inference engine outputs a N×(M+1) matrix (also referred to as "first matrix"), and a (N+1)×M matrix (also referred to as "second matrix"), respectively.

Here, the first matrix is the correspondence matrix shown in FIG. 12A to which a column representing the probability that each tracking target object in the first image does not exist in the second image (i.e., the probability of occurrence of appearance and disappearance) is added as the last column. For example, in the first image and the second image shown in FIG. 8, since the pedestrian having the detection number "2" present in the first image is not likely to exist in the second image, the element in the newly-added third column in the second row corresponding to the detection number "2" is "0.8".

The second matrix is a matrix obtained by adding a row representing the probability that each tracking target object in the second image does not exist in the first image (i.e., the probability of occurrence of appearance and disappearance) to the correspondence matrix shown in FIG. 12A. For example, in the first image and the second image shown in FIG. 8, each pedestrian having the detection numbers "1a" and "2a" present in the second image is likely to be present in the first image, so that each element in the added row has a low value (0.1).

Thus, according to the example shown in FIG. 12B, it is possible to output a correspondence matrix that accurately includes information on the probability of appearance and disappearance of the tracking target object.

(6-4) Learning of Inference Engine

Next, the learning of the inference engine by the learning unit 18 will be described.

According to the first learning specification, the learning unit 18 provides a channel (also referred to as "correspondence probability channel") representing the probability of the correspondence and a channel (also referred to as "non-correspondence probability channel") representing the probability of the non-correspondence in the correspondence matrix to be outputted by the inference engine, and performs learning of the inference engine so that the sum of the probability of each element in the channel direction becomes 1. The correspondence probability channel is an example of the first channel, the non-correspondence probability channel is an example of the second channel.

FIG. 13A is an example of a correspondence matrix that is set as a correct answer in the first learning specification when the inference engine outputs the correspondence matrix according to the format shown in FIG. 12A. In this instance, the learning unit 18 recognizes the correspondence relation of the tracking target objects between the first image and the second image on the basis of the tracking association information Ir and sets the correct answer correspondence matrix including the correspondence probability channel and the non-correspondence probability channel. In this case, as shown in FIG. 13A, each element of the N×M (here, 3×2) correspondence matrix has a correspondence probability channel and non-correspondence probability channel, and the sum of each element in the channel direction is set to be 1. In addition, in the inference engine, a SoftMax layer is provided as the output layer so that the sum of each element in the channel direction in the correspondence matrix becomes 1.

FIG. 13B is an example of the first matrix of the correspondence matrix that is set as the correct answer in the first learning specification when the inference engine outputs the correspondence matrix according to the format shown in FIG. 12B. In this case, each element of the first matrix that is a N×(M+1) (here, 3×3) matrix has a correspondence probability channel and non-correspondence probability channel, and the sum in the channel direction is set to be 1. FIG. 13C is an example of the second matrix of the correspondence matrix that is set as the correct answer in the first learning specification when the inference engine outputs the correspondence matrix according to the format shown in FIG. 12B. In this case, each element of the second matrix that is a (N+1)×M (here, 4×2) matrix has a correspondence probability channel and non-correspondence probability channel, and the sum in the channel direction is set to be 1. In addition, in the inference engine, a SoftMax layer is provided as the output layers so that the sum of each element of the correspondence matrix in the channel direction is set to be 1.

Then, the learning unit 18 learns the inference engine using the correct answer correspondence matrix shown in FIG. 13A or the correct answer correspondence matrix shown in FIG. 13B or FIG. 13C. Specifically, the learning unit 18 inputs the feature information IF based on the first training image and the second training image to the inference engine and acquires a correspondence matrix including the correspondence probability channel and the non-correspondence probability channel outputted from the inference engine. Then, the learning unit 18 learns the inference engine so that the loss (error) between the outputted correspondence matrix and the correct answer correspondence matrix including the correspondence probability channel and the non-correspondence probability channel is minimized. In this case, for example, a SoftMax cross entropy or the like is used as the loss function. In this way, the learning unit 18 can suitably perform learning of the inference engine on the basis of the first learning specification.

According to the second learning specification, the learning unit 18 performs learning of the inference engine such that the sum of elements of the correspondence matrix outputted by the inference engine in the row direction or the column direction is set to be 1 becomes 1. In the second learning specification, the correspondence matrix according to the format shown in FIG. 12B is assumed.

FIG. 14A is an example of the first matrix of the correspondence matrix that is set as the correct answer in the second learning specification when the inference engine outputs the correspondence matrix according to the format shown in FIG. 12B. Further, FIG. 14B is an example of the second matrix of the correspondence matrix that is set as the correct answer in the second learning specification when the inference engine outputs the correspondence matrix according to the format shown in FIG. 12B. As shown in FIG. 14A, in the first matrix, the sum of elements for each row is at least set to be 1. On the other hand, as shown in FIG. 14B, in the second matrix, the sum of elements for each column is at least set to be 1. Further, in this case, as the output layer of the inference engine, a SoftMax layer is used so that the sum for each row in the first matrix is 1 and the sum for each column in the second matrix is 1.

Then, the learning unit 18 uses the pair of the first matrix shown in FIG. 14A and the second matrix shown in FIG. 14B as the correct answer correspondence matrix and performs learning of the inference engine. In this case, a SoftMax cross entropy or the like is used as the loss function, for example. In this way, the learning unit 18 can preferably perform learning of the inference engine even according to the second learning specification.

(7) Processing Flow

Next, a processing flow in which the learning device 1 and the tracking device 3 respectively execute will be described.

(7-1) Learning Process

Figure 15:
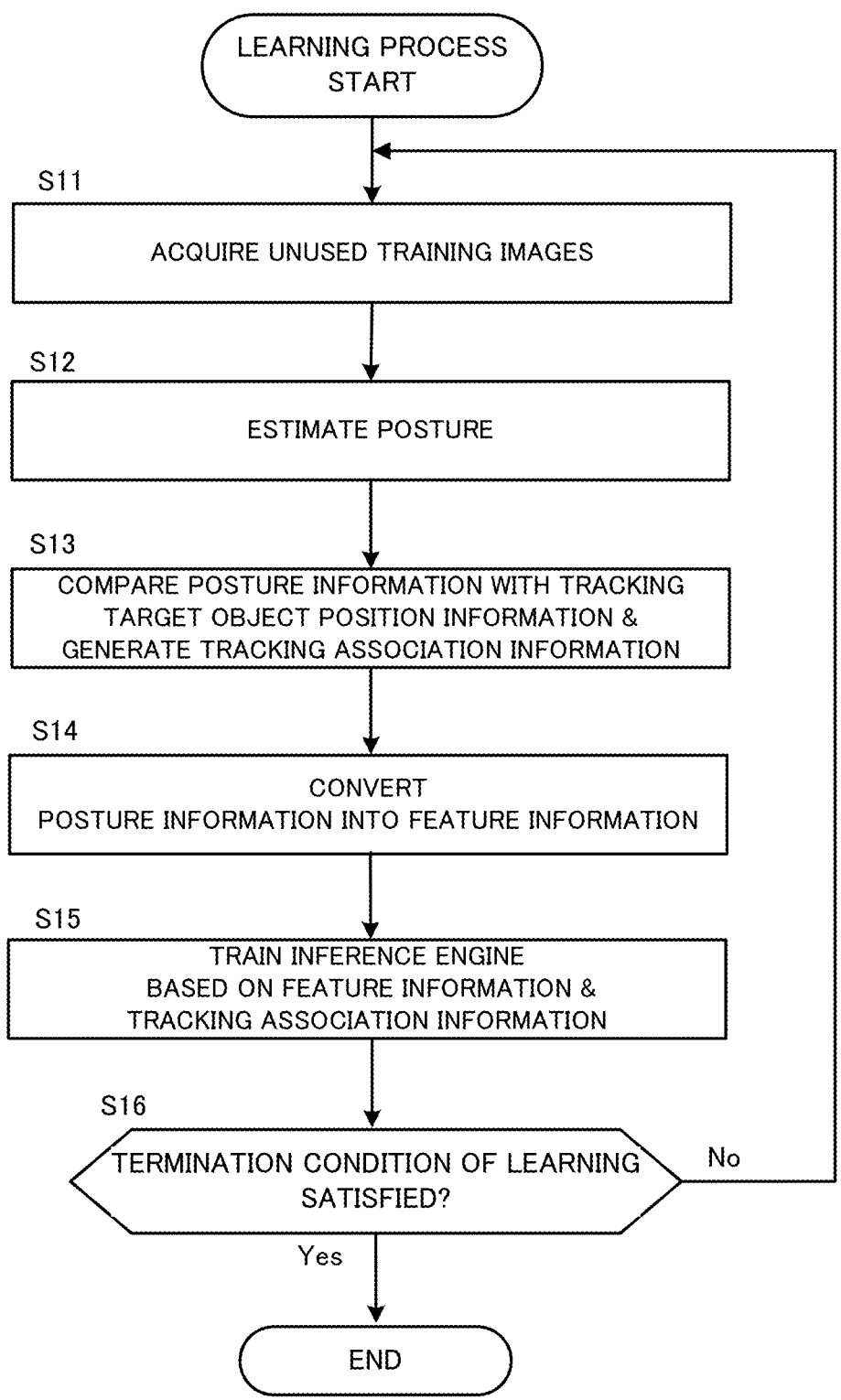
FIG. 15 illustrates an example of a flowchart showing a processing procedure relating to the learning of the inference engine.

FIG. 15 is an example of a flowchart illustrating a processing procedure relating to the learning of the inference engine to be executed by the learning device 1.

First, the posture estimation unit 15 acquires time series training images which are not yet used for training from the tracking training data storage unit 21 (step S11). In this case, for example, the posture estimation unit 15 extracts, from the tracking training data storage unit 21 as training images, the first training image and the second training image which are captured in time series and which becomes a pair not used for training yet.

Next, the posture estimation unit 15 performs the posture estimation of the tracking target objects on the time series training images acquired at step S11 (step S12). In this instance, the pose estimation unit 15 estimates the position, in the image, of the predetermined types of the feature points for each tracking target object for each of the time series training images, thereby generating the pose information Ip.

Next, the estimation result matching unit 16 generates the tracking association information Ir through the comparison (matching) between the posture information Ip generated by the posture estimation unit 15 at step S12 and the tracking target object position information (step S13). In this case, the estimation result matching unit 16 acquires, from the tracking training data storage unit 21, tracking target object position information indicating the positions of the tracking target objects shown in the time series training images extracted at step S11.

Further, the feature extraction unit 17 converts the posture information Ip generated by the posture estimation unit 15 at step S12 into the feature information IF (step S14). The process at step S14 may be performed simultaneously with the process at step S13, or may be performed in the opposite order.

Next, the learning unit 18 performs training of the inference engine based on the feature information IF generated by the feature extraction unit 17 at step S14 and the tracking association information Ir generated by the estimation result matching unit 16 at step S13 (step S15). In this case, based on the tracking association information Ir, the learning unit 18 generates a correct answer correspondence matrix according to the format shown in any one of: FIG. 13A; FIGS. 13B and 13C; and FIGS. 14A and 14B. Then, the learning unit 18 determines the parameters of the inference engine such that the loss (error) between the correct answer correspondence matrix and the correspondence matrix outputted by the inference engine when the feature information IF is inputted thereto. The learning unit 18 stores the determined parameters in the parameter storage unit 22.

Then, the learning device 1 determines whether or not the termination condition of learning is satisfied (step S16). For example, if a user input to instruct the termination of the learning is detected, or if the processes at step S11 to step S15 is executed for all of the time series training images stored in the tracking training data storage unit 21, the learning device 1 determines that the termination condition is satisfied. In another example, the learning device 1 determines that the termination condition is satisfied when the loss calculated at step S15 is less than or equal to a predetermined threshold value. In yet another example, when the processes at step S11 to step S15 are repeated a predetermined number of times, the learning device 1 determines that the terminal condition is satisfied. When the learning device 1 determines that the termination condition of the learning is satisfied (step S16; Yes), the process of the flow chart is terminated. On the other hand, when the learning device 1 determines that the termination condition of the learning is not satisfied (step S16; No), the process returns to step S11.

(7-2) Tracking Process

Figure 16:
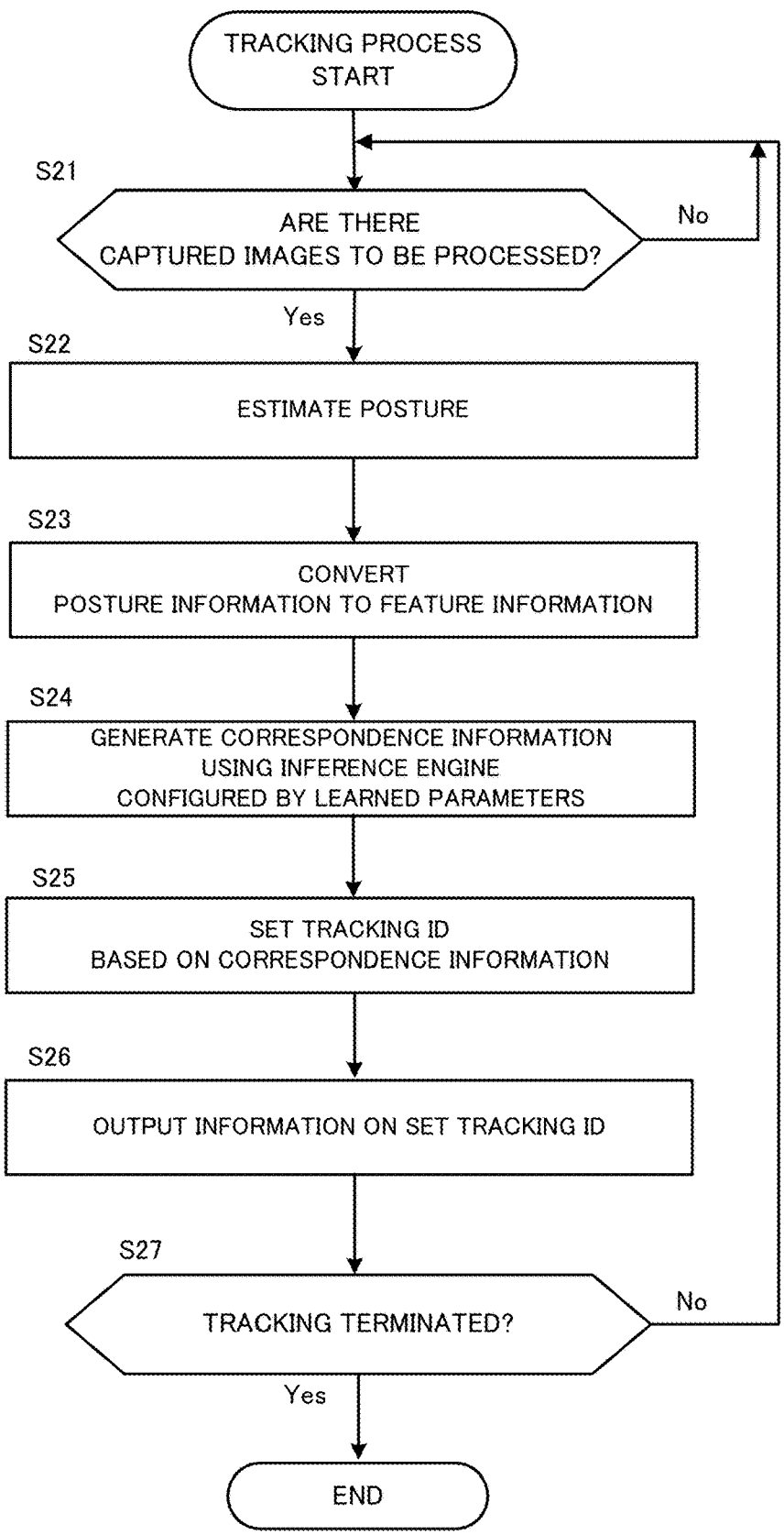
FIG. 16 illustrates an example of a flowchart showing the procedure of the tracking process.

FIG. 16 is an example of a flowchart illustrating a procedure of a tracking process that is executed by the tracking device 3.

First, the posture estimation unit 35 of the tracking device 3 determines whether or not there are time series captured images to be processed (step S21). In this case, for example, the posture estimation unit 15 determines whether or not there are unprocessed two images in time series stored in the captured image/tracking information storage unit 23. Then, if the posture estimation unit 15 determines that there are time series captured image to be processed (step S21; Yes), the process proceeds to step S22. On the other hand, if the posture estimation unit 15 determines that there is no time series captured images to be processed (step S21; No), the posture estimation unit 15 continues the determination at step S21.

If there are time series captured images to be processed, the posture estimation unit 35 performs the posture estimation of the tracking target objects with respect to these captured images (step S22). In this instance, the posture estimation unit 35 estimates the positions, in the image, of the predetermined type of the feature points for each of the time series captured images and for each tracking target object, thereby generating the posture information Ip.

Next, the feature extraction unit 37 converts the posture information Ip generated by the posture estimation unit 35 at step S22 into the feature information IF (step S23). Then, the correspondence information generation unit 38 generates the correspondence information Ic using the inference engine with reference to the parameters of the inference engine learned by the learning device 1 (step S24). In this instance, the correspondence information generation unit 38 acquires, as the correspondence information Ic, information indicating the correspondence matrix outputted from the inference engine by inputting the feature information IF generated at step S23 into the inference engine.

Next, the tracking information management unit 39 sets the tracking ID for each tracking target object shown in the target captured images based on the correspondence information Ic generated by the correspondence information generation unit 38 at step S24 (step S25). In this instance, the tracking information management unit 39 assigns the tracking ID to each tracking target object present in the captured images to be processed. When it is determined that a tracking target object disappears or appears between the captured images, the tracking information management unit 39 deletes or newly issues the tracking ID.

Then, the tracking information management unit 39 outputs information on the set tracking ID (step S26). For example, the tracking information management unit 39 stores information on the tracking ID set at step S25 in association with the captured image to be processed in the captured image/tracking information storage unit 23. In another example embodiment, the tracking information management unit 39 may supply the information on the tracking ID set at step S25 to another processing unit configured to perform process regarding a higher-level application, or may display it on a display device or the like.

Then, the tracking device 3 determines whether or not to terminate the tracking process (step S27). For example, the tracking device 3 terminates the tracking process when there is a user input that the tracking process should be terminated, or when a predetermined termination condition on the tracking process is satisfied. Then, if the tracking device 3 determines that the tracking process should be terminated (step S27; Yes), the tracking device 3 ends the process of the flowchart. On the other hand, if the tracking device 3 determines that the tracking process should not be terminated (step S27; No), the process returns to step S21.

(8) Technical Effects

A supplementary description will be given of technical effects in the first example embodiment.

Generally, in the tracking of objects and/or people, in such a congestion situation in which overlapping of objects and/or people occurs frequently, the propagating error of the tracking ID occurs due to the change of features caused by the overlapping of objects and/or people or the transition of the tracking ID by objects and/or people passing each other. Therefore, robust tracking technology even in such a congestion situation is required. For example, in Patent Literature 1, after the posture estimation of a tracking target object, tracking target objects among frames are compared and matched by rule base using the distance of each joint point among frames. However, in the case of performing such a rule-based matching, there is a possibility that matching errors for identical tracking target objects frequently occur due to estimation errors in the posture estimation engine used for posture estimation. In other words, in a congestion situation in which an posture estimation error is likely to occur, there are cases in which the postures estimated for time series frames differ greatly due to human or object overlapping or the like, and there are cases in which a common tracking ID cannot be given to identical tracking target objects.

Taking the above into consideration, in the present example embodiment, an inference engine configured to infer the correspondence relation from posture estimation results as an input is constructed through learning. This enables construction of an inference engine configured to output the result that is robust to the posture estimation error, because the learning of the inference engine is carried out considering the tendency of the estimation error in the posture estimation. In addition, by using such an inference engine, the tracking device 3 can perform robust tracking even in a congested situation in which tracking target objects are crowded in the images, and appropriately assign a common tracking ID to identical tracking target objects.

Second Example Embodiment

Figure 17:
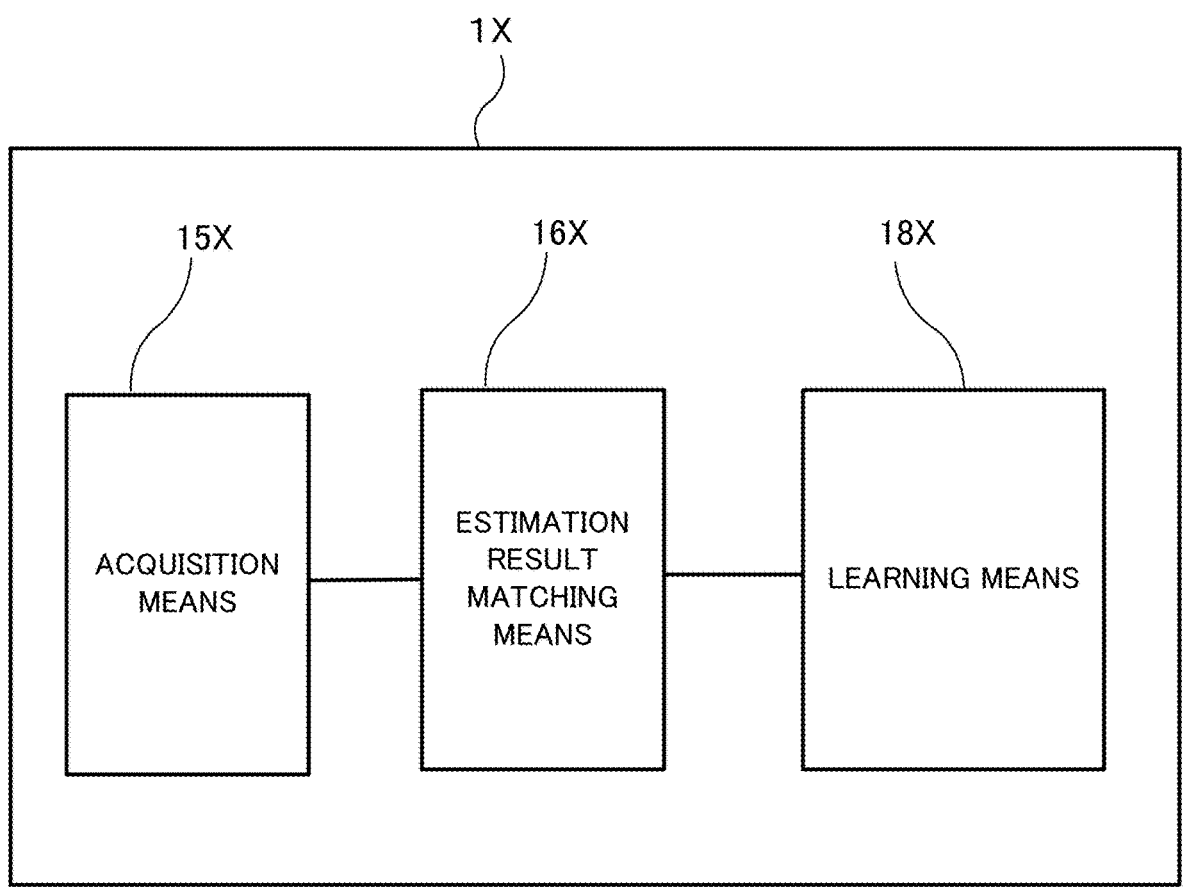
FIG. 17 illustrates a schematic configuration of a learning device according to a second example embodiment.

FIG. 17 shows a schematic configuration of a training device 1X according to a second example embodiment. The learning device 1X mainly includes an acquisition means 15X, an estimation result matching means 16X, and a learning means 18X.

The acquisition means 15X is configured to acquire tracking training data in which a first training image and a second training image which are training images captured in time series, tracking target object position information regarding a position or a posture of a tracking target object shown in each of the first training image and the second training image, and identification information of the tracking target object are associated. The acquisition means 15X may be a posture estimation unit 15 and an estimation result matching unit 16 that refer to the tracking training data storage unit 21 through the interface 13 in the first example embodiment. The acquisition means 15X is only required to refer to the tracking training data, and it may receive the tracking training data from another device or may extract the tracking training data stored in the learning device 1X. Further, the "identification information of the tracking target object" corresponds to the tracking ID according to the first example embodiment.

The estimation result matching means 16X is configured to compare the tracking target object position information with posture information indicative of an estimated posture of the tracking target object estimated from each of the first training image and the second training image and associate the posture information with the identification information of the tracking target object. The estimation result matching means 16X may be the estimation result matching unit 16 according to the first example embodiment. The learning device 1X may generate the above-described posture information on the basis of the first training image and the second training image by itself, or may acquire the posture information generated by any other device on the basis of the first training image and the second training image.

The learning means 18X is configured to learn an inference engine based on the posture information and the identification information of the tracking target object, the inference engine being configured to infer correspondence information when information based on the posture information is inputted to the inference engine, the correspondence information indicating correspondence relation of the tracking target object between the first training image and the second training image. Here, the "information based on the posture information" may be the posture information itself, or may be information (e.g., the feature information IF in the first example embodiment) into which the posture information is converted and which conforms to a input data format of the inference engine. The learning means 18X may be the learning unit 18 according to the first example embodiment.

Figure 18:
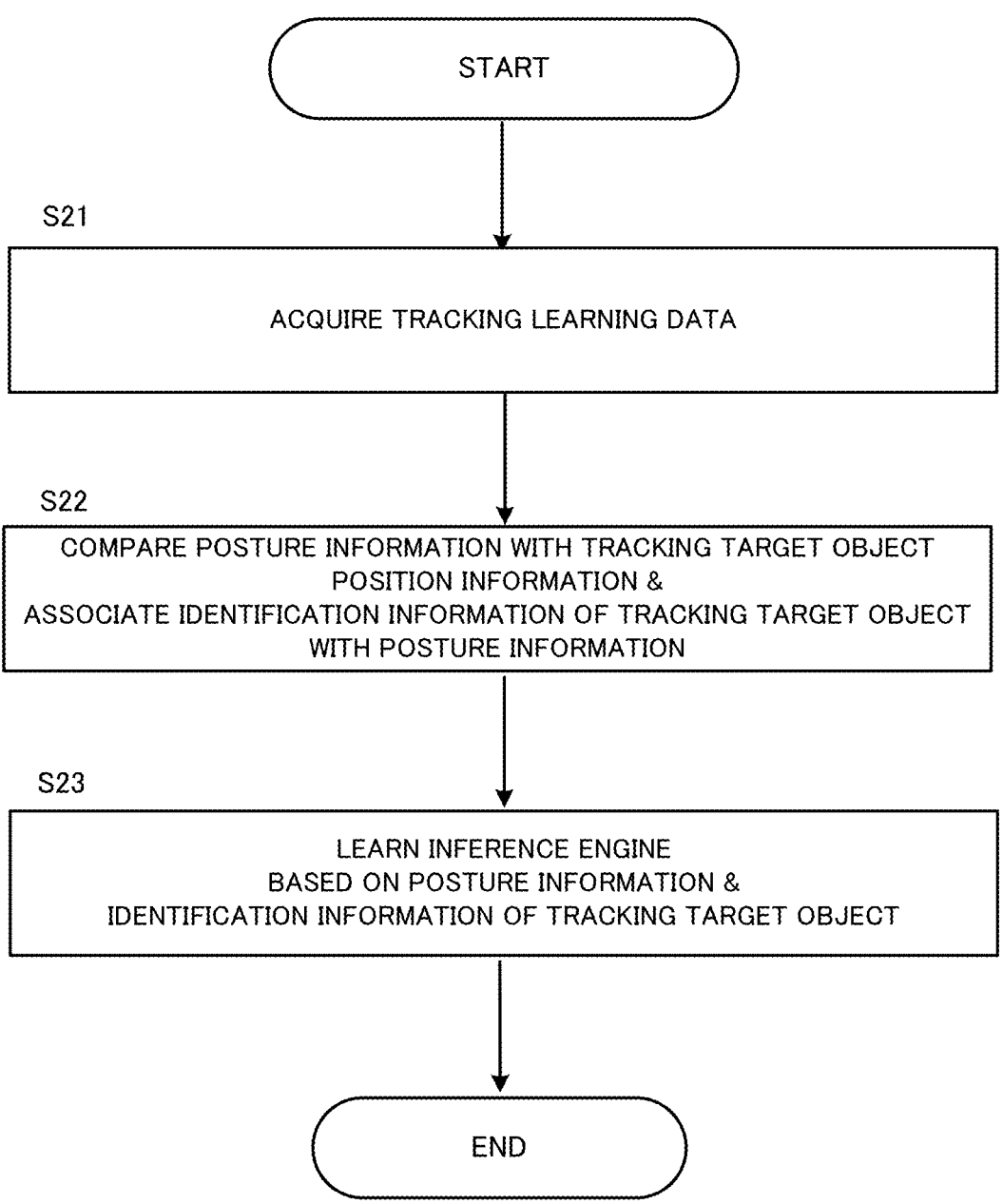
FIG. 18 illustrates an example of a flowchart showing a processing procedure to be executed by the learning device in the second example embodiment.

FIG. 18 is an example of a flowchart illustrating a process to be executed by the learning device 1X in the second example embodiment. The acquisition means 15X acquires tracking training data in which a first training image and a second training image which are training images captured in time series, tracking target object position information regarding a position or a posture of a tracking target object shown in each of the first training image and the second training image, and identification information of the tracking target object are associated (step S21). The estimation result matching means 16X compares the tracking target object position information with posture information indicative of an estimated posture of the tracking target object estimated from each of the first training image and the second training image and associates the posture information with the identification information of the tracking target object (step S22). The learning means 18X learns an inference engine based on the posture information and the identification information of the tracking target object, the inference engine being configured to infer correspondence information when information based on the posture information is inputted to the inference engine, the correspondence information indicating correspondence relation of the tracking target object between the first training image and the second training image (step S23).

According to the second example embodiment, the learning device 1X can suitably perform the learning of the inference engine configured to infer the correspondence information indicating the corresponding relation among the tracking target objects shown in time series images by considering the tendency of the estimation error in the posture estimation.

The whole or a part of the example embodiments (including modifications, the same shall apply hereinafter) described above can be described as, but not limited to, the following Supplementary Notes.

[Supplementary Note 1]

A learning device comprising:
  an acquisition means configured to acquire tracking training data in which a first training image and a second training image which are training images captured in time series, tracking target object position information regarding a position or a posture of a tracking target object shown in each of the first training image and the second training image, and identification information of the tracking target object are associated;
  an estimation result matching means configured to
    compare the tracking target object position information with posture information indicative of an estimated posture of the tracking target object estimated from each of the first training image and the second training image and
    associate the posture information with the identification information; and
  a learning means configured to learn an inference engine based on the posture information and the identification information,
    the inference engine being configured to infer correspondence information when information based on the posture information is inputted to the inference engine,
    the correspondence information indicating correspondence relation of the tracking target object between the first training image and the second training image.

[Supplementary Note 2]

The learning device according to Supplementary Note 1, further comprising a feature extraction means configured to convert the posture information into feature information which is information indicating a position of each feature point of the tracking target objects detected from the training images captured in time series, wherein the learning means is configured to input the feature information to the inference engine as the information based on the posture information.

[Supplementary Note 3]

The learning device according to Supplementary Note 2, wherein the feature extraction means is configured to generate the feature information according to a format that is based on:
  the number of detections of the tracking target objects in the first training image;
  the number of detections of the tracking target objects in the second training image; and
  the number of the feature points.

[Supplementary Note 4]

The learning device according to any one of Supplementary Notes 1 to 3, wherein the inference engine is a neural network with a convolution layer.

[Supplementary Note 5]

The learning device according to any one of Supplementary Notes 1 to 4, wherein the correspondence information indicates a matrix including each element indicating a probability that each of the tracking target objects in the first training image corresponds to each of the tracking target objects in the second training image.

[Supplementary Note 6]

The learning device according to Supplementary Note 5, wherein the matrix further comprises a row or a column indicating a probability of appearance or disappearance of the tracking target object in the first training image and the second training image.

[Supplementary Note 7]

The learning device according to Supplementary Note 6, wherein the learning means is configured to learn the inference engine so that a sum of elements for each row or each column of the matrix is set to be a predetermined value.

[Supplementary Note 8]

The learning device according to Supplementary Note 5 or 6,
  wherein the matrix includes:
    a first channel including each element indicating the probability that each of the tracking target objects in the first training image corresponds to each of the tracking target objects in the second training image; and
    a second channel including each element indicating a probability that each of the tracking target objects in the first training image does not correspond to each of the tracking target objects in the second training image, and
  wherein the learning means is configured to learn the inference engine so that a sum of the each element in channel direction is set to be a predetermined value.

[Supplementary Note 9]

The learning device according to any one of Supplementary Notes 1 to 8,
wherein the tracking target object position information is
information indicating an existence area of each tracking target object in the first training image and the second training image, or
information indicating a position of each feature point of each tracking target object in the first training image and the second training image.

[Supplementary Note 10]

The learning device according to any one of Supplementary Notes 1 to 9, further comprising
a posture estimation means configured to generate the posture information by estimating the posture of each tracking target object shown in the first training image and the second training image based on the first training image and the second training image.

[Supplementary Note 11]

A tracking device comprising:
an acquisition means configured to acquire a first captured image and a second captured image captured in time series;
a posture estimation means configured to generate, based on the first captured image and the second captured image, posture information indicative of an estimation result of a posture of a tracking target object in each of the first captured image and the second captured image; and
a correspondence information generation means configured to generate correspondence information based on the posture information and an inference engine learned by the learning device according to any one of Supplementary Notes 1 to 10, the correspondence information indicating a correspondence relation of the tracking target object between the first captured image and the second captured image.

[Supplementary Note 12]

The learning device according to Supplementary Note 11, further comprising tracking information management means configured to manage identification information assigned to the tracking target object based on the correspondence information.

[Supplementary Note 13]

A learning method executed by a computer, the learning method comprising:
acquiring tracking training data in which a first training image and a second training image which are training images captured in time series, tracking target object position information regarding a position or a posture of a tracking target object shown in each of the first training image and the second training image, and identification information of the tracking target object are associated;
comparing the tracking target object position information with posture information indicative of an estimated posture of the tracking target object estimated from each of the first training image and the second training image and associating the posture information with the identification information; and
learning an inference engine based on the posture information and the identification information,
the inference engine being configured to infer correspondence information when information based on the posture information is inputted to the inference engine,
the correspondence information indicating correspondence relation of the tracking target object between the first training image and the second training image.

[Supplementary Note 14]

A storage medium storing a program executed by a computer, the program causing the computer to:
acquire tracking training data in which a first training image and a second training image which are training images captured in time series, tracking target object position information regarding a position or a posture of a tracking target object shown in each of the first training image and the second training image, and identification information of the tracking target object are associated;
compare the tracking target object position information with posture information indicative of an estimated posture of the tracking target object estimated from each of the first training image and the second training image and associate the posture information with the identification information; and
learn an inference engine based on the posture information and the identification information,
the inference engine being configured to infer correspondence information when information based on the posture information is inputted to the inference engine,
the correspondence information indicating correspondence relation of the tracking target object between the first training image and the second training image.

[Supplementary Note 15]

A tracking method executed by a computer, the tracking method comprising:
acquiring a first captured image and a second captured image captured in time series;
generating, based on the first captured image and the second captured image, posture information indicative of an estimation result of a posture of a tracking target object in each of the first captured image and the second captured image; and
generating correspondence information based on the posture information and an inference engine learned by the learning device according to any one of Supplementary Notes 1 to 10, the correspondence information indicating a correspondence relation of the tracking target object between the first captured image and the second captured image.

[Supplementary Note 16]

A storage medium storing a program executed by a computer, the program causing the computer to:
acquire a first captured image and a second captured image captured in time series;
generate, based on the first captured image and the second captured image, posture information indicative of an estimation result of a posture of a tracking target object in each of the first captured image and the second captured image; and
generate correspondence information based on the posture information and an inference engine learned by the learning device according to any one of Supplementary Notes 1 to 10, the correspondence information indicating a correspondence relation of the tracking target object between the first captured image and the second captured image.

While the invention has been particularly shown and described with reference to example embodiments thereof, the invention is not limited to these example embodiments. It will be understood by those of ordinary skilled in the art that various changes in form and details may be made therein without departing from the spirit and scope of the present invention as defined by the claims. In other words, it is needless to say that the present invention includes various modifications that could be made by a person skilled in the art according to the entire disclosure including the scope of the claims, and the technical philosophy. All Patent and Non-Patent Literatures mentioned in this specification are incorporated by reference in its entirety.

INDUSTRIAL APPLICABILITY

It is suitably applied to the posture and movement tracking of a person and/or an object in the safety business. For example, it is suitably applied to intrusion detection and counting of people in a station, automatic behavior monitors of players in sports, and behavior recognition such as stagger detection at a station platform.

DESCRIPTION OF REFERENCE NUMERALS 1, 1x Learning device
2 Storage device
3 Tracking device
4 Camera
11, 31 Processor
12, 32 Memory
13, 33 Interface
21 Tracking training data storage unit
22 Parameter storage unit
23 Captured image/tracking information storage unit
100 Tracking system

What is claimed is:

1. A learning device comprising:
at least one memory configured to store instructions; and
at least one processor configured to execute the instructions to:
acquire tracking training data in which a first training image and a second training image which are training images captured in time series, tracking target object position information regarding a position or a posture of a tracking target object shown in each of the first training image and the second training image, and identification information of the tracking target object are associated;
compare the tracking target object position information with posture information indicative of an estimated posture of the tracking target object estimated from each of the first training image and the second training image and
associate the posture information with the identification information; and
learn an inference engine based on the posture information and the identification information,
the inference engine being configured to infer correspondence information when information based on the posture information is inputted to the inference engine,
the correspondence information indicating correspondence relation of the tracking target object between the first training image and the second training image.

2. The learning device according to claim 1, wherein the at least one processor is configured to further execute the instructions to convert the posture information into feature information which is information indicating a position of each feature point of the tracking target objects detected from the training images captured in time series, and
wherein the at least one processor is configured to execute the instructions to input the feature information to the inference engine as the information based on the posture information.

3. The learning device according to claim 2,
wherein the at least one processor is configured to execute the instructions to generate the feature information according to a format that is based on:
the number of detections of the tracking target objects in the first training image;
the number of detections of the tracking target objects in the second training image; and
the number of the feature points.

4. The learning device according to claim 1,
wherein the inference engine is a neural network with a convolution layer.

5. The learning device according to claim 1,
wherein the correspondence information indicates a matrix including each element indicating a probability that each of the tracking target objects in the first training image corresponds to each of the tracking target objects in the second training image.

6. The learning device according to claim 5,
wherein the matrix further comprises a row or a column indicating a probability of appearance or disappearance of the tracking target object in the first training image and the second training image.

7. The learning device according to claim 6,
wherein the at least one processor is configured to execute the instructions to learn the inference engine so that a sum of elements for each row or each column of the matrix is set to be a predetermined value.

8. The learning device according to claim 5,
wherein the matrix includes:
a first channel including each element indicating the probability that each of the tracking target objects in the first training image corresponds to each of the tracking target objects in the second training image; and
a second channel including each element indicating a probability that each of the tracking target objects in the first training image does not correspond to each of the tracking target objects in the second training image, and
wherein the at least one processor is configured to execute the instructions to learn the inference engine so that a sum of the each element in channel direction is set to be a predetermined value.

9. The learning device according to claim 1,
wherein the tracking target object position information is information indicating an existence area of each tracking target object in the first training image and the second training image, or
information indicating a position of each feature point of each tracking target object in the first training image and the second training image.

10. The learning device according to claim 1,
wherein the at least one processor is configured to further execute the instructions to generate the posture information by estimating the posture of each tracking target object shown in the first training image and the second training image based on the first training image and the second training image.

11. A tracking device comprising:
at least one memory configured to store instructions; and
at least one processor configured to execute the instructions to:
acquire a first captured image and a second captured image captured in time series;
generate, based on the first captured image and the second captured image, posture information indicative of an estimation result of a posture of a tracking target object in each of the first captured image and the second captured image; and
generate correspondence information based on the posture information and an inference engine, the inference engine being configured to infer the correspondence information when information based on the posture information is inputted to the inference engine, the correspondence information indicating a correspondence relation of the tracking target object between the first captured image and the second captured image.

12. The tracking device according to claim 11,
wherein the at least one processor is configured to further execute the instructions to manage identification information assigned to the tracking target object based on the correspondence information.

13. A learning method executed by a computer, the learning method comprising:
acquiring tracking training data in which a first training image and a second training image which are training images captured in time series, tracking target object position information regarding a position or a posture of a tracking target object shown in each of the first training image and the second training image, and identification information of the tracking target object are associated;
comparing the tracking target object position information with posture information indicative of an estimated posture of the tracking target object estimated from each of the first training image and the second training image and associating the posture information with the identification information; and
learning an inference engine based on the posture information and the identification information,
the inference engine being configured to infer correspondence information when information based on the posture information is inputted to the inference engine,
the correspondence information indicating correspondence relation of the tracking target object between the first training image and the second training image.

* * * * *